US011688039B2

(12) United States Patent
Shu et al.

(10) Patent No.: US 11,688,039 B2
(45) Date of Patent: Jun. 27, 2023

(54) METHOD FOR GENERATING A SUPER-RESOLUTION IMAGE AND RELATED DEVICE

(71) Applicant: TELEDYNE DIGITAL IMAGING, INC., Toronto (CA)

(72) Inventors: Felicia Yan Shu, Waterloo (CA); Matthias Sonder, Waterloo (CA)

(73) Assignee: TELEDYNE DIGITAL IMAGING, INC., Toronto (CA)

( * ) Notice: Subject to any disclaimer, the term of this patent is extended or adjusted under 35 U.S.C. 154(b) by 38 days.

(21) Appl. No.: 17/290,879

(22) PCT Filed: Sep. 20, 2019

(86) PCT No.: PCT/CA2019/051344
§ 371 (c)(1),
(2) Date: May 3, 2021

(87) PCT Pub. No.: WO2020/191475
PCT Pub. Date: Oct. 1, 2020

(65) Prior Publication Data
US 2022/0005157 A1     Jan. 6, 2022

Related U.S. Application Data

(60) Provisional application No. 62/823,591, filed on Mar. 25, 2019.

(51) Int. Cl.
*G06T 3/40* (2006.01)
*G06T 7/13* (2017.01)
*G06T 5/50* (2006.01)

(52) U.S. Cl.
CPC .......... *G06T 3/4076* (2013.01); *G06T 3/4069* (2013.01); *G06T 5/50* (2013.01); *G06T 7/13* (2017.01)

(58) Field of Classification Search
CPC ....... G06T 3/4076; G06T 3/4069; G06T 5/50; G06T 7/13
See application file for complete search history.

(56) References Cited

U.S. PATENT DOCUMENTS 9,501,683 B1    11/2016  Hatstat et al.
2017/0076128 A1   3/2017  Hatstat et al.
(Continued)

FOREIGN PATENT DOCUMENTS

CN    111242855 B  *  6/2022  ............. G06T 5/002
WO    2007001820 A2   1/2007
(Continued)

OTHER PUBLICATIONS

S. Rana, H. Singh and A. Kumar, "Comparative Analysis of Single and Multi Frame Super Resolution in Satellite Imagery," IGARSS 2018—2018 IEEE International Geoscience and Remote Sensing Symposium, Valencia, Spain, 2018, pp. 7220-7223, doi: 10.1109/IGARSS.2018.8517329. (Year: 2018).*
(Continued)

*Primary Examiner* — Charles T Shedrick
(74) *Attorney, Agent, or Firm* — K&L Gates LLP

(57) ABSTRACT

A method for generating a super-resolution image and related device is provided. In one aspect, the method comprises: receiving a first low-resolution image and a second low-resolution image, the first low-resolution image and second low-resolution image have a first spatial resolution and having been captured simultaneously by a pair of pixel arrays of a common image sensor, wherein the pixel arrays of the image sensor are located as to be diagonally shifted from each other by a sub-pixel increment; adaptively enhancing the first low-resolution and the second low-resolution images to generate an enhanced first low-resolution image and an enhanced second low-resolution image, respectively; mapping (e.g., non-uniformly) pixels of each
(Continued)

of the enhanced first and second low-resolution images to a super-resolution grid having a spatial resolution greater than the first spatial resolution to generate a first intermediate super-resolution image and a second intermediate super-resolution image, respectively; and combining the first intermediate super-resolution image and second intermediate super-resolution image to generate a composite super-resolution image.

15 Claims, 17 Drawing Sheets

(56) References Cited

U.S. PATENT DOCUMENTS

| | | | | |
|---|---|---|---|---|
| 2022/0337751 A1* | 10/2022 | Bleyer | ............... | G06T 3/4076 |
| 2022/0337894 A1* | 10/2022 | Price | .................. | G06T 17/20 |
| 2022/0398704 A1* | 12/2022 | Sun | .................... | G06T 5/002 |

FOREIGN PATENT DOCUMENTS

| | | | | |
|---|---|---|---|---|
| WO | 2011090790 A1 | 7/2011 | | |
| WO | WO-2016049544 A1 * | 3/2016 | ............ | G01J 1/4228 |
| WO | 2018/170393 A2 | 9/2018 | | |
| WO | WO-2022225803 A1 * | 10/2022 | ........... | G02B 27/017 |

OTHER PUBLICATIONS

International Search Report and Written Opinion for International Application No. PCT/CA2019/051344 dated Dec. 24, 2019, 10 pages.
Park et al., Super-Resolution Image Reconstruction: A Technical Overview, IEEE Signal Processing Magazine, May 2003, vol. 20(3), pp. 21-36. Retrieved from https://ieeexplore.ieee.org/documents/1203207.
Zeng et al., A PDE Approach to Super-resolution with Contrast Enhancement, IEEE, Nov. 29, 2010, vol. 2010, 3rd International Congress on Image and Signal Processing (CISP2010), pp. 600-604. Retrieved from https://ieeexplore.ieee.org/documents/5647255?reload=true&arnumber=5647255.
Glasner et al., Super-resolution from a single image, IEEE, 2009, 12th International Conference on Computer Vision (ICCV), pp. 349-356. Retrieved from https://ieeexplore.ieee.org/document/5459271.
International Preliminary Report on Patentability for International Application No. PCT/CA2019/051344 dated Sep. 28, 2021, 7 pages.

* cited by examiner

METHOD FOR GENERATING A SUPER-RESOLUTION IMAGE AND RELATED DEVICE

RELATED APPLICATION DATA

The present application is a national stage application filed under 35 U.S.C. § 371 claiming benefit of and priority to International Application serial number PCT/CA2019/051344 entitled METHOD FOR GENERATING A SUPER-RESOLUTION IMAGE AND RELATED DEVICE, filed Sep. 20, 2019, which further claims benefit of and priority to U.S. provisional patent application No. 62/823,591, filed Mar. 25, 2019, both of which are incorporated herein by reference in their entireties and for all purposes.

TECHNICAL FIELD

The present disclosure relates to image processing, and more particularly, to a method and device for spatial resolution enhancement, and more particularly to a method for generating a super-resolution image and related device.

BACKGROUND

A line scan camera has one or more lines of pixels that image across an object. A line scan camera may be used to create a two-dimensional image of the object by either moving the camera or the object perpendicular to the line of pixels, capturing lines at each position, and combining the lines.

The acquisition and analysis of images via line scan cameras is performed by machine vision applications to determine certain metrics for controlling or assessing a process. High-resolution images are desirable in most machine vision applications for line scan cameras as the additional detail may be useful, or even necessary, for more precise analysis. However, the cost of high precision optics and image sensor required for such a task is often prohibitively expensive.

One approach to increase spatial resolution is to reduce sensor pixel size, thereby increasing number of pixels per unit area, without changing the size of the die (also referred to as the chip size) on which the image sensing circuitry and the image processing circuitry are formed. The amount of light that can be captured decreases. This leads to increased noise among other drawbacks, such as decreased sensitivity. Another approach is to increase spatial resolution while maintaining the same signal to noise ratio is to increase the chip size. However, increasing the chip size also increases capacitance. This can cause further difficulties, such as speeding up the charge transfer rate of charge packets in a charge-coupled device (CCD), and thereby limiting speed of the device.

In view of the foregoing problems, there has been increased reliance on software-based image processing techniques to at least address some of the foregoing issues. One approach, known as super-resolution, refers to enhancing the resolution of an image beyond the resolution inherent to the image capturing device, often by combining the information contained in multiple under sampled low-resolution images generated from the image capturing device. Currently, many super-resolution enhancement algorithms, in both spatial domain and frequency domain, rely on combining the information from three or more subpixel shifted low-resolution images of the same scene. In such algorithms, the focus is often on steps such as motion estimation amongst the multiple low-resolution images, building mathematic models to non-uniformly interpolate spread pixels, characterizing the aliasing relationship among low-resolution images, and iteratively back-projecting. Existing algorithms are often complicated and may require considerable processing power and time, which may decrease line scan rate. Further, by requiring at least three or more low-resolution images, any such algorithms may not be cost-effective, particularly for line scan camera applications.

SUMMARY

The present disclosure provides a method for image spatial resolution enhancement. In accordance with the method of the present disclosure, a super-resolution image is generated from a pair of low-resolution images. It is believed that the method of the present disclosure may at least partially overcome some of the disadvantages of existing solutions of generating a super-resolution image. For example, the method of the present disclosure may provide a relatively low-cost and effective way for generating a super-resolution image with less stringent imaging optics or sensing hardware requirements. For example, many existing low-resolution image systems that previously could not be used for super-resolution image generation may be capable of utilizing the method of the present disclosure for super-resolution image generation. Additionally, the use of fewer low-resolution images is less computationally intensive, resulting in higher speeds of processing and throughput. Further, the method of the present disclosure may improve the resolving power of an imaging device and has the potential to offer significant value advantage over competitive products for at least some line scan camera applications.

The present disclosure provides a method of generating a super-resolution image from two low-resolution images acquired by an image acquisition device, and a related device. The two low-resolution images are diagonally pixel-shifted by a half-pixel increment. Prior to combining the two low-resolution images, the two low-resolution images are each adaptively enhanced and the edge data for each low-resolution image is extracted and preserved. The pixels of the two enhanced low-resolution images are then mapped (e.g., non-uniformly) to a grid of a super-resolution image that has a spatial resolution larger than the spatial resolution of the low-resolution images. The mapped images are intermediate super-resolution images that are combined, for example, by bilinear stacking, to generate a composite super-resolution image such that the pixels in the composite super-resolution image contain unique intensity values. The preserved edge data/information is analyzed to identify an amount of contrast enhancement locally and an appropriate amount of edge information is applied to the combined image to generate a super-resolution image.

The method of the present disclosure advantageously obviates the need for motion estimation as required by some of the known algorithms. A spatial resolution enhancement may be achieved at least in part by adaptively enhancing the low-resolution images before being combined. In addition, the pixels of the low-resolution images are mapped (e.g., non-uniformly) on to the super-resolution grid so that no pixels on the combined grid contain the same intensity values. Furthermore, the preservation of edge information of the low-resolution images before being enhanced or combined allows the use of edge information for enhancement of local contrast. Lastly, the method of the present disclosure avoids the drawbacks of interpolation methods that are common in the art.

The generated super-resolution image may be used to generate a high modulation transfer function (MTF), low-resolution image (also known as a high sharpness, low-resolution image or high accuracy, low-resolution image) at the same resolution as the low-resolution images used to construct the super-resolution image.

The method for generating the high sharpness, low-resolution image may take the diagonal pixel shift into consideration and intelligently downsample the generated super-resolution image to provide an output that is of the same resolution as low-resolution images used to construct the super-resolution image image but with improved MTF. The generated image may advantageously take up less storage memory while still maintaining improved contrast.

In accordance with one aspect of the present disclosure, there is provided a method of generating a super-resolution image, comprising: receiving a first low-resolution image and a second low-resolution image of the same scene, the first low-resolution image and second low-resolution image have a first spatial resolution and having been captured simultaneously by a pair of pixel arrays of a common image sensor, wherein the pixel arrays of the image sensor are located as to be diagonally shifted from each other by a sub-pixel increment; adaptively enhancing the first low-resolution image and the second low-resolution image to generate an enhanced first low-resolution image and an enhanced second low-resolution image, respectively; mapping pixels of each of the enhanced first and second low-resolution images to a super-resolution grid having a spatial resolution greater than the first spatial resolution to generate a first intermediate super-resolution image and a second intermediate super-resolution image, respectively; and combining the first intermediate super-resolution image and second intermediate super-resolution image to generate a composite super-resolution image. The method may further comprises enhancing the contrast of the composite super-resolution image with enhanced edge information as described below. The method may enable the imaging system to achieve twice the native resolution of the image sensor with enhanced MTF at the same pixel size, the same chip size, the same signal to noise ratio and the same responsivity.

In some or all of the above, the sub-pixel increment is a half-pixel.

In some or all of the above, the spatial resolution of the super-resolution grid is twice the first spatial resolution of the first low-resolution and the second low-resolution image.

In some or all of the above, the method further comprises: identifying pixels in the composite super-resolution image for contrast enhancement; determining an amount of contrast enhancement for each pixel identified for contrast enhancement; and applying the determined amount of contrast enhancement to each pixel identified for contrast enhancement to generate a contrast restored super-resolution image.

In some or all of the above, the method further comprises: extracting first edge information from the first low-resolution image and second edge information from the second low-resolution image; mapping pixels of the first edge information and second edge information to a super-resolution grid having a spatial resolution greater than the first spatial resolution to generate first super-resolution edge information and second super-resolution edge information, respectively; adaptively enhancing and combining the first super-resolution edge information and the second super-resolution edge information to generate an enhanced super-resolution edge information grid; and enhancing the composite super-resolution image with the enhanced super-resolution edge information grid to generate a contrast restored super-resolution image.

In some or all of the above, an edge detection algorithm is used to extract first edge information from the first low-resolution image and second edge information from the second low-resolution image.

In some or all of the above, the edge detection algorithm comprises a Sobel filter.

In some or all of the above, enhancing the composite super-resolution image with the enhanced super-resolution edge information comprises: for each pair of spatial corresponding pixels in the first super-resolution edge information and the second super-resolution edge information: setting a spatial corresponding value of an enhanced super-resolution edge information grid to a maximum of the values of the pair of spatial corresponding pixels in response to a determination that both pixels in the pair have a positive value; setting a spatial corresponding value of the enhanced super-resolution edge information grid to a minimum of the values of the pair of spatial corresponding pixels in response to a determination that both pixels in the pair have a negative value; and setting a spatial corresponding value of the enhanced super-resolution edge information grid to an average of the values of the pair of spatial corresponding pixels in response to a determination that one of the pixels in the pair has a positive value and one of the pixels in the pair has a negative value; and combining the composite super-resolution image with the enhanced super-resolution edge information grid.

In some or all of the above, adaptively enhancing the first low-resolution and the second low-resolution image comprises: extracting first edge information from the first low-resolution image and second edge information from the second low-resolution image; for each pixel in the first low-resolution image or the second low-resolution image: determining, using the first edge information or second edge information, whether the pixel in the first or second low-resolution image is an edge pixel; for each pixel that is an edge pixel, determining a maximum value and minimum value of the pixels within a pre-determined area centered at the pixel, and enhancing a value of to the pixel in the first or second low-resolution image in response to a determination that the enhanced pixel has an initial value greater than the maximum value or less than the minimum value.

In some or all of the above, the value of to the pixel in the first or second low-resolution image is enhanced by adding an unsharp mask configured for noise reduction and halo suppression.

In some or all of the above, adaptively enhancing the first low-resolution and the second low-resolution image comprises: extracting first edge information from the first low-resolution image and second edge information from the second low-resolution image; applying a smoothing algorithm to the first low-resolution image and the second low-resolution image; generating an unsharp mask for each of the first low-resolution image and the second low-resolution image based on the first and second low-resolution images and the smoothed first low-resolution image and second low-resolution image, wherein the unsharp mask has a spatial resolution the same as the first spatial resolution of the first low-resolution image and the second low-resolution image; initialize an enhanced image by adding the unsharp mask to the first or second low-resolution image; for each pixel in the first low-resolution image and the second low-resolution image: determining, using the first edge information or second edge information, whether the pixel in the first or second low-resolution image is an edge pixel; for each pixel that is an edge pixel, determining a maximum value and minimum value of the pixels within a pre-determined area centered at the pixel, and determining whether the pixel has a value between the maximum value and minimum value and whether the value of the corresponding pixel in the enhanced low-resolution image is bigger than the maximum value or smaller than the minimum value, enhancing a value of a pixel in the unsharp mask corresponding to the pixel in the first or second low-resolution image by an enhancement factor in response to a determination that the pixel has a value between the maximum value and minimum value and the corresponding pixel in the enhanced low-resolution image has a value beyond the maximum value and minimum value, and replacing the value of the pixel in the enhanced low-resolution image by the sum of the enhanced value of the pixel in the unsharp mask and the value of the pixel in the low-resolution image.

In some or all of the above, generating the unsharp mask for each of the first low-resolution image and the second low-resolution image comprises: initializing the unsharp mask as a difference between the first or second low-resolution image and the smoothed first or second low-resolution image respectively; for each pixel in the unsharp mask: determining, using the first edge information or second edge information, whether the pixel in the unsharp mask is an edge pixel; for each pixel that is an edge pixel, enhancing a value of the pixel in the unsharp mask by an enhancement factor in response to an absolute value of the pixel in the unsharp mask being greater than or equal to an enhancement threshold; for each pixel that is not an edge pixel, setting a value of the pixel in the unsharp mask to zero in response to an absolute value of the pixel in the unsharp mask being less greater than or equal to a cutoff threshold; for each pixel that is not an edge pixel, enhancing a value of the pixel in the unsharp mask by an enhancement factor in response to an absolute value of the pixel in the unsharp mask being greater than or equal to the enhancement threshold.

In some or all of the above, the smoothing algorithm is a Gaussian blur filter.

In some or all of the above, the method further comprises: adaptively enhancing the contrast restored super-resolution image; starting at a first pixel, performing a first pass bilinear downsampling on the enhanced super-resolution image to generate a first intermediate low-resolution image; starting at a second pixel diagonally shifted from the first pixel by a pixel increment, performing a second bilinear downsampling on the enhanced super-resolution image to generate a second intermediate low-resolution image; and combining the first and second intermediate low-resolution images to generate a high sharpness, low-resolution image.

In some or all of the above, the first and second intermediate low-resolution images are combined by averaging the intensity values of spatially corresponding pixels in the first and second intermediate low-resolution images.

In some or all of the above, adaptively enhancing the contrast restored super-resolution image comprises: extracting edge information from the contrast restored super-resolution image; for each pixel in the contrast restored super-resolution image: determining, using the edge information, whether the pixel is an edge pixel; for each pixel that is an edge pixel, determining a maximum value and minimum value of the pixels within a pre-determined area centered at the pixel, and enhancing a value of to the pixel in the first or second low-resolution image in response to a determination that the enhanced pixel has an initial value greater than the maximum value or less than the minimum value.

In some or all of the above, the value of to the pixel in the first or second low-resolution image is enhanced by adding an unsharp mask configured for noise reduction and halo suppression.

In some or all of the above, adaptively enhancing the contrast restored super-resolution image comprises: extracting edge information from the contrast restored super-resolution image; applying a smoothing algorithm to the contrast restored super-resolution image; generating an unsharp mask for the contrast restored super-resolution image based on the super-resolution image and the smoothed contrast restored super-resolution image, wherein the unsharp mask has a spatial resolution the same as the first spatial resolution of the contrast restored super-resolution image; initializing an enhanced super-resolution image by adding the unsharp mask to the contrast restored super-resolution image; for each pixel in the contrast restored super-resolution image: determining, using the edge information, whether the pixel is an edge pixel; for each pixel that is an edge pixel, determining a maximum value and minimum value of the pixels within a pre-determined area centered at the pixel, determining whether the pixel has a value between the maximum value and minimum value and whether the value of the corresponding pixel in the enhanced super-resolution image is bigger than the maximum value or smaller than the minimum value, enhancing a value of a pixel in the unsharp mask corresponding to the pixel in the contrast restored super-resolution image by an enhancement factor in response to a determination that the pixel has a value between the maximum value and minimum value and the corresponding pixel in the enhanced super-resolution image has a value beyond the maximum value and minimum value, and replacing the value of the pixel in the enhanced super-resolution image by the sum of the enhanced value of the element in the unsharp mask and the intensity of the pixel in the contrast restored super-resolution image.

In some or all of the above, generating the unsharp mask for the contrast restored super-resolution image comprises: initializing the unsharp mask as a difference between the contrast restored super-resolution image and the smoothed contrast restored super-resolution image; for each pixel in each unsharp mask: determining, using the edge information, whether the pixel in the unsharp mask is an edge pixel; for each pixel that is an edge pixel, enhancing a value of the pixel in the unsharp mask by an enhancement factor in response to an absolute value of the pixel in the unsharp mask being greater than or equal to an enhancement threshold; for each pixel that is not an edge pixel, setting a value of the pixel in the unsharp mask to zero in response to an absolute value of the pixel in the unsharp mask being less greater than or equal to a cutoff threshold; for each pixel that is not an edge pixel, enhancing a value of the pixel in the unsharp mask by an enhancement factor in response to an absolute value of the pixel in the unsharp mask being greater than or equal to the enhancement threshold.

In some or all of the above, the smoothing algorithm is a Gaussian blur filter.

In some or all of the above, the first pass and the second pass bilinear downsamplings are performed by averaging a plurality of pixels in the high-resolution image.

In some or all of the above, the plurality of pixels form a two-by-two kernel.

In some or all of the above, the method further comprises: adding a pixel padding to the first and second low-resolution images, wherein a size of the pixel padding is dependent upon image processing parameters.

In some or all of the above, combining the first intermediate super-resolution image and second intermediate super-resolution image to generate a composite super-resolution image is performed by bilinear stacking.

In some or all of the above, the method further comprises: acquiring the first low-resolution image and second low-resolution image.

In some or all of the above, the pixels of each of the enhanced first and second low-resolution images are mapped to the super-resolution grid non-uniformly.

In accordance with another aspect of the present disclosure, there is provided a method, comprising: adaptively enhancing a high-resolution image to generate an enhanced high-resolution image; starting at a first pixel, performing a first pass bilinear downsampling on the enhanced high-resolution image to generate a first intermediate low-resolution image; starting at a second pixel diagonally shifted from the first pixel by a pixel increment, performing a second bilinear downsampling on the enhanced high-resolution image to generate a second intermediate low-resolution image; and combining the first and second intermediate low-resolution images to generate a high sharpness, low-resolution image.

In some or all of the above, the first and second intermediate low-resolution images are combined by averaging the intensity values of spatially corresponding pixels in the first and second intermediate low-resolution images.

In some or all of the above, adaptively enhancing the high-resolution image comprises: extracting edge information from the high-resolution image; for each pixel in the high-resolution image: determining, using the edge information, whether the pixel is an edge pixel; for each pixel that is an edge pixel, determining a maximum value and minimum value of the pixels within a pre-determined area centered at the pixel, and enhancing a value of to the pixel in the high-resolution image in response to a determination that the enhanced pixel has an initial value greater than the maximum value or less than the minimum value.

In some or all of the above, the value of to the pixel in the first or second low-resolution image is enhanced by adding an unsharp mask configured for noise reduction and halo suppression.

In some or all of the above, adaptively enhancing the high-resolution image comprises: extracting edge information from the high-resolution image; applying a smoothing algorithm to the high-resolution image; generating an unsharp mask for the high-resolution image based on the high-resolution image and the smoothed high-resolution image, wherein the unsharp mask has a spatial resolution the same as the first spatial resolution of the high-resolution image; initialize an enhanced image by adding the unsharp mask to the high-resolution image; for each pixel in the high-resolution image: determining, using the edge information, whether the pixel is an edge pixel; for each pixel that is an edge pixel, determining a maximum value and minimum value of the pixels within a pre-determined area centered at the pixel, determining whether the pixel has a value between the maximum value and minimum value and whether the value of the corresponding pixel in the enhanced high-resolution image is bigger than the maximum value or smaller than the minimum value, enhancing a value of a pixel in the unsharp mask corresponding to the pixel in the high-resolution image by an enhancement factor in response to a determination that the pixel has a value between the maximum value and minimum value and the corresponding pixel in the enhanced high-resolution image has a value beyond the maximum value and minimum value, and replacing the value of the pixel in the enhanced high-resolution image by the sum of the enhanced value of the element in the unsharp mask and the value of the pixel in the high-resolution image.

In some or all of the above, generating the unsharp mask for the high-resolution image comprises: initializing the unsharp mask as a difference between the high-resolution image and the smoothed high-resolution image: determining, using the edge information, whether the pixel in the unsharp mask is an edge pixel; for each pixel that is an edge pixel, enhancing a value of the pixel in the unsharp mask by an enhancement factor in response to an absolute value of the pixel in the unsharp mask being greater than or equal to an enhancement threshold; for each pixel that is not an edge pixel, setting a value of the pixel in the unsharp mask to zero in response to an absolute value of the pixel in the unsharp mask being less greater than or equal to a cutoff threshold; for each pixel that is not an edge pixel, enhancing a value of the pixel in the unsharp mask by an enhancement factor in response to an absolute value of the pixel in the unsharp mask being greater than or equal to the enhancement threshold.

In some or all of the above, the smoothing algorithm is a Gaussian blur filter.

In some or all of the above, the first pass and the second pass bilinear downsamplings are performed by averaging a plurality of pixels in the high-resolution image.

In some or all of the above, the plurality of pixels form a two-by-two kernel.

In accordance with a further aspect of the present disclosure, there is provided a method of generating a super-resolution image, comprising: receiving a first low-resolution image and a second low-resolution image of the same scene, the first low-resolution image and second low-resolution image have a first spatial resolution and having been captured simultaneously by a pair of pixel arrays of a common image sensor, wherein the pixel arrays of the image sensor are located as to be diagonally shifted from each other by a sub-pixel increment; adaptively enhancing the first low-resolution and the second low-resolution image to generate an enhanced first low-resolution image and an enhanced second low-resolution image, respectively; extracting edge information from the first and second low-resolution images, respectively (wherein the edge information corresponds to changes of pixel intensity); mapping (e.g., non-uniformly) pixels of each of the enhanced first and second low-resolution images to a super-resolution grid having a spatial resolution greater than the first spatial resolution to generate a first intermediate super-resolution image and a second intermediate super-resolution image, respectively; combining the first intermediate super-resolution image and second intermediate super-resolution image to generate a composite super-resolution image; mapping (e.g., non-uniformly) edge information of the first and second low-resolution images to a super-resolution grid having a spatial resolution greater than the first spatial resolution to generate an enhanced super-resolution edge information; and enhancing a contrast of the composite super-resolution image with the enhanced super-resolution edge information to generate a contrast restored super-resolution image.

In accordance with yet a further aspect of the present disclosure, there is provided an imaging sensor, comprising: a first pixel array; a second pixel array diagonally shifted from the first pixel array by a sub-pixel increment; wherein the imaging sensor is configured to a capture a first low-resolution image having of a first spatial resolution via the pixel array, and a second low-resolution image having a second spatial resolution.

In some or all of the above, the first low-resolution image and second low-resolution image are captured simultaneously.

In some or all of the above, the first low-resolution image and second low-resolution image capture a common scene at a common time diagonally shifted by the sub-pixel increment.

In some or all of the above, the sub-pixel increment is a half-pixel.

In some or all of the above, the first spatial resolution and the second spatial resolution are the same.

In accordance with yet further aspects of the present disclosure, there is provided an apparatus comprising at least one processor, wherein the executable instructions, when executed by the at least one processor, cause the processor to perform at least parts of the methods described herein. The apparatus may further comprise an imaging sensor configured to capture images. The apparatus may be a line scan camera.

In accordance with yet further aspects of the present disclosure, there is provided a non-transitory machine readable medium having tangibly stored thereon executable instructions for execution by at least one processor, wherein the executable instructions, when executed by the at least one processor, cause the processor to perform at least parts of the methods described herein.

DESCRIPTION OF EXAMPLE EMBODIMENTS

Figure 1:
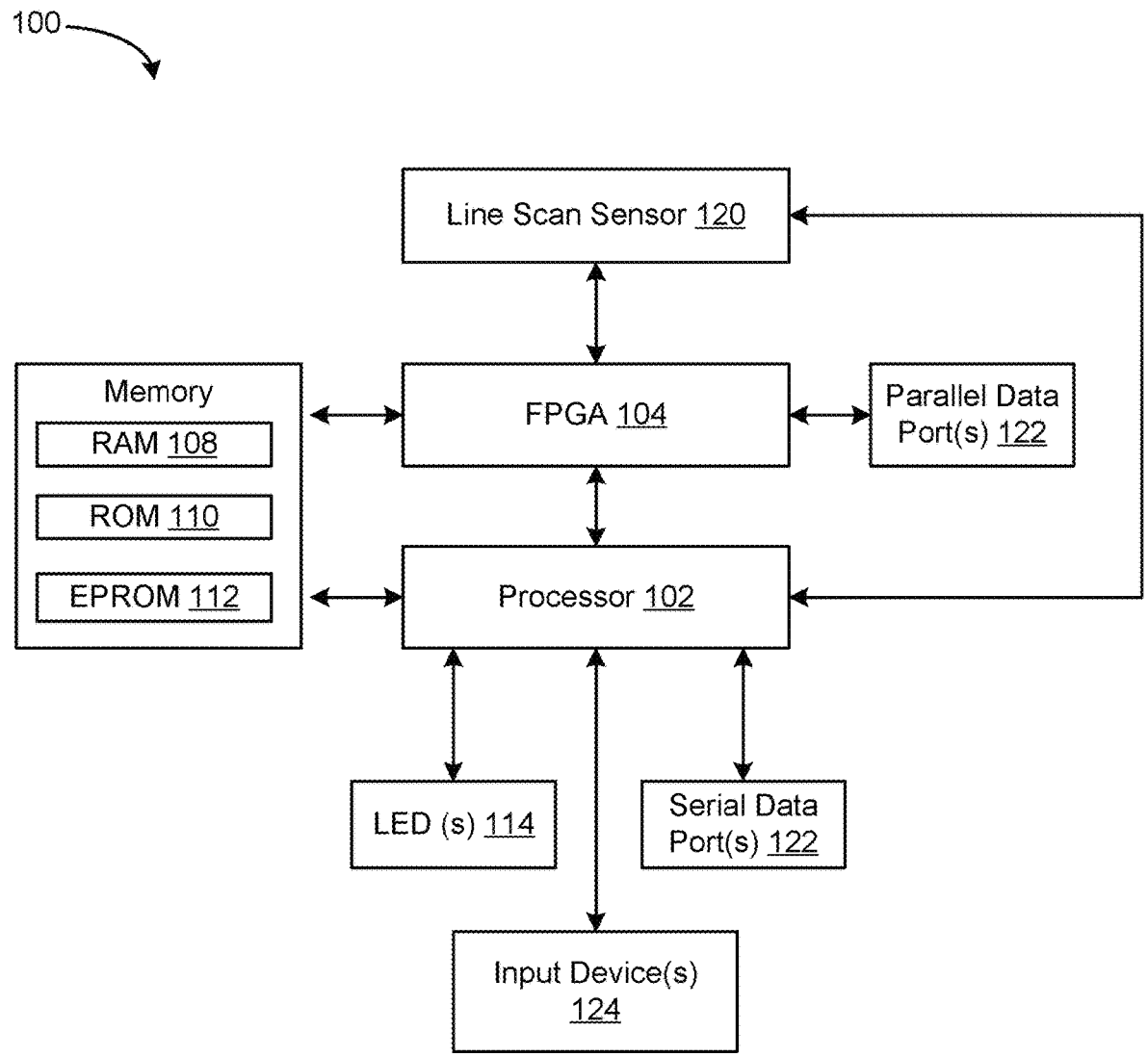
FIG. 1 is a block diagram illustrating select components of a line scan camera suitable for practicing the teachings of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

The terms low-resolution (LR) and high-resolution (HR) are used in the present disclosure to refer to digital image resolution and are relative terms used to indicate one or more advantages of the present disclosure in providing digital images with a higher resolution than those produced natively by an image acquisition device. The term super-resolution (SR) refers to an enhanced image resolution generated from multiple aliased low-resolution mages by image processing techniques. FIG. 1 is a block diagram illustrating select components of a line scan camera 100 suitable for practicing the teachings of the present disclosure. The line scan camera 100 includes a processor 102 (e.g., microprocessor or microcontroller) coupled to a plurality of components via a communication bus (not shown) which provides a communication path between the various components and the processor 102. The line scan camera 100 also comprises memory such as Random Access Memory (RAM) 108, Read Only Memory (ROM) 110, a persistent (non-volatile)

memory 112 which may be flash erasable programmable read only memory (EPROM) ("flash memory") or other suitable form of memory.

The processor 102 performs various image processing functions. The processor 102 is typically a programmable processor but may be, for example, a hard-wired custom integrated circuit (IC) processor, or a combination thereof. In other embodiments, a dedicated image processor may be provided rather than having the processor 102 perform image processing functions.

The line scan camera 100 also comprises a line scan sensor 120 which receives light from the area being imaged. Image data captured by the line scan sensor 120 is transferred to a readout register (also known as a line buffer). In the shown embodiment, the readout register is a field-programmable gate array (FPGA) 104. The line scan camera 100 also comprises one or more parallel data ports 112 for exchanging data with external systems, connected to the FPGA 104 in the shown embodiment, and one or more serial data ports 122 for exchanging data with external systems, connected to the processor 102 in the shown embodiment. The readout register outputs data to a buffer memory (not shown), such as another FPGA. The line data stored in the FPGA buffer memory may then undergo further processing and/or transfer to a host system via a serial data port 122, parallel data port 112, or both. The line scan camera 100 typically also includes one or more light emitting diodes (LEDs) 114 which are turned on or flashed to provided various notifications and optionally one or more user input devices 124 (e.g., buttons).

The line scan sensor 120 may be a charge-coupled device (CCD), complementary metal-oxide semiconductor (CMOS) sensor or other suitable sensor. The line scan sensor 120 may be monochrome, multicolor (e.g., RGB color) or multispectral. The line scan sensor 120 has one or more lines of pixel sensors: the line scan sensor 120 may be a single line or multiline sensor. The line scan sensor 120 may alternatively be a time delay and integration (TDI) sensor. Suitable line scan cameras are made by Teledyne Digital Imaging, Inc. (Waterloo, Ontario, Canada). Each line of the line scan sensor 120 has a number of pixel sensors. Each pixel sensor generates and corresponds to a pixel in the digital image output by the line scan sensor 120. The number of pixel sensors in each line of the line scan camera 120 may be 2,048 to 16,384 or more, resulting in a digital image having 2,048 to 16,384 or more pixels per line (or row). Each pixel sensor outputs a pixel value in the form of a digital number (DN) which represents a response level of light at a certain wavelength.

The pixel value is a single number that represents the intensity (or brightness) of the pixel. The number of bits of the pixels and the color (or lack of color) captured by the line scan sensor 120 may vary between line sensors. For example, the pixels may be 8-bit grayscale, 8-bit color, 16-bit color, 24-bit color, 30-bit color, 36-bit color or 48-bit color. In some examples, 8-bit pixels are used with individual pixel values ranging from 0 to 255. For grayscale (monocolor) line scan cameras, typically a pixel value of 0 represents black, 255 represents white, and values in between 0 and 255 define different shades of gray. Color line scan cameras have rows of sensor pixels with different color filters or different color filters on pixels along the row, to detect light of different wavelengths. Typically, red, green, and blue (RGB) color filters are used but more and different filter types may be used for some applications. Each color filter is located on pixels to detect light of different wavelengths, typically red, green or blue, so that the pixel value of 0 represents no color (e.g., no red, no green, no blue) and 255 represents full color, and values in between 0 and 255 define different shades of a respective color. Color line scan cameras may sometimes be operated on monocolor or full color modes. To represent full color, separate red, green and blue components are specified for each pixel in an RGB colorspace, so the pixel value is actually a vector of three numbers that may be stored as different components as three separate color planes (one for each of red, green and blue), which are recombined when displaying or processing in full color. The term "pixel" in the present disclosure refers to elements of a digital image object which may include digital images captured and output by the line scan camera 120, portions of digital images captured and output by the line scan camera 120 such as edge elements (or points) extracted from digital images captured by the line scan camera 120 as well as masks and other image filters used in digital image signal processing operations.

During the camera's exposure time each pixel accumulates photoelectric charges proportional to the light from the object imaged onto that pixel. At the end of the exposure time the charges in an entire row of pixels are transferred into the readout register (e.g., FPGA 104). The readout register shifts out the pixel charges and they are amplified, corrected and digitized to produce the camera output. The readout register temporarily stores image data for one or more lines, typically 1 to 3 lines, before the line scan data is transferred to memory. The readout register shifting is done while the next row of pixels is being exposed. The rate at which exposure and readout occurs is called the "line rate" and is typically specified in hertz (Hz) or kilohertz (kHz). The line scan camera 100 may have a line rate of up to 200 kHz or more. An adjustable aperture and shutter assembly (not shown) is used to control the aperture size and the exposure time of the line scan sensor 120.

The processor 102 may control the image sensor 120 by supplying various control signals to the line scan sensor 120. The memory of the line scan camera 100, for example the EPROM 112, has stored thereon software that is executed by the processor 102 that controls the operation of the line scan camera 100. The line scan camera 100 may also or alternatively be controlled, at least in part, by the FPGA 104. Although a specific configuration of different types of memory is described, this is merely one example and a different configuration and assignment of functions to different types of memory may be used.

Although not shown in FIG. 1 or described above, it will be understood to the skilled person that lens, illumination, and focusing optics are used in combination with the line scan camera as part of a line scan imaging system. Typically, these components are not controlled by the line scan camera.

Figure 2:
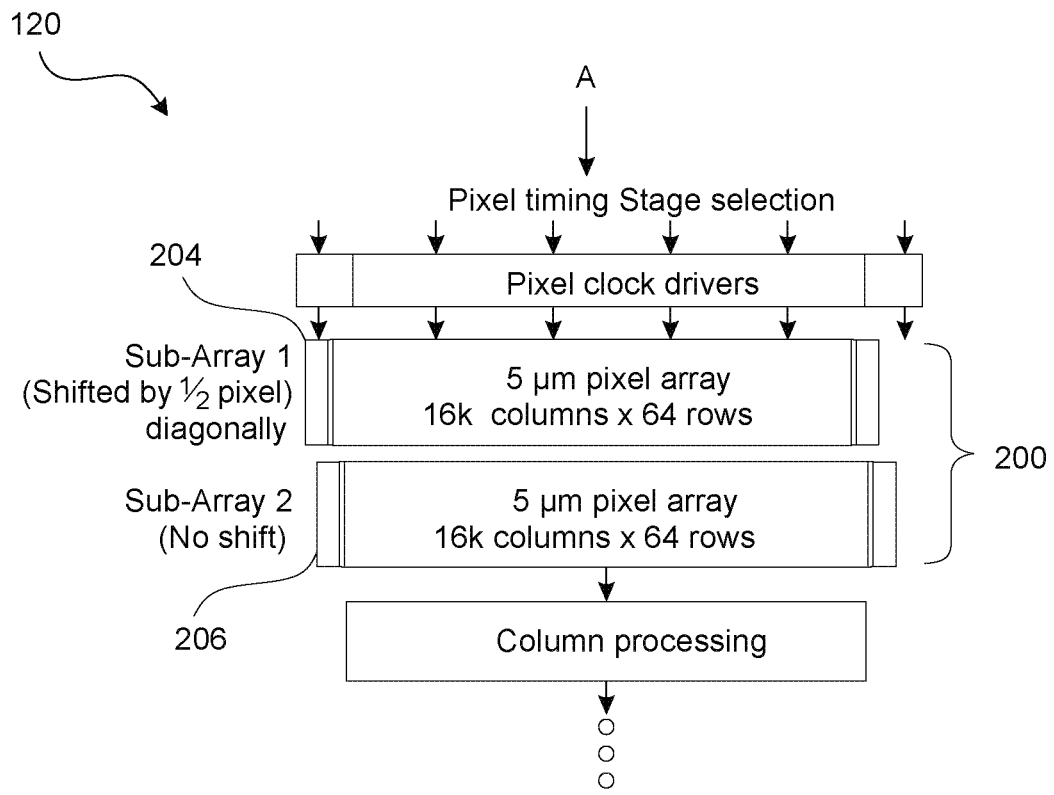
FIG. 2 is a schematic diagram illustrating a sensor pixel array arrangement in accordance with one example embodiment of the present disclosure.

FIG. 2 is a schematic diagram illustrating a sensor pixel array arrangement in accordance with one example embodiment of the present disclosure. In the example of FIG. 2, the sensor pixel array arrangement is for a TDI sensor. However, the teachings of the present disclosure can be applied to other line scan sensors and other suitable sensors such as area scan sensors. The image sensor 120 comprises photodetector arrays 200 comprising two arrays (or sub-arrays) 204 and 206. The photodetector arrays 200 may comprise a plurality of metal-oxide semiconductors (MOS) capacitors that convert incoming photons into electrical charges at the semiconductor-oxide interface. The electrical charges may be read, for example as a voltage, and used to determine a digital pixel values that form a digital image. The photodetectors in each of the arrays 204 and 206 may be arranged in a two-dimensional fashion defined by a number of rows (n) and a number of columns (m). Typically, the resolution of a particular photodetector array is expressed in the form of "n×m". Each individual photodetector is defined by a pixel size that is indicative of the size of the smallest object that the sensor array can differentiate. In some examples, the pixel size may be 5 μm.

The two photodetector arrays 204, 206 are provided in a stacked configuration with the array 206 located physically underneath the array 204 on the sensor die with the array 204 diagonally shifted by a half-pixel increment from the array 206. The arrays 204, 206 may be mounted on trays or carriages. The position of the arrays 204, 206 may be manipulated to apply shifts of subpixel precision. The array 204 may be diagonally shifted by a half-pixel increment from the array 206 by performing a horizontal half-pixel shift combined with a vertical half-pixel shift along the plane in the direction indicated by arrow A. The diagonal half-pixel shift provides that no single pixel will be perfectly duplicated in the captured images from the two subarrays 204, 206.

The line scan camera 100 generates two low-resolution images of a subject or scene which are shifted geometrically by a half-pixel diagonally. Line scan camera 100 may image a moving conveyor having a plurality of objects (e.g., parts or products) located thereon and moving along with the conveyor. The processor 102 of the line scan camera 100 receives and processes the two low-resolution images to generate a corresponding super-resolution image. Although in the described embodiment the processor 102 is a component of the line scan camera 100, a separate processing unit distinct from the line scan camera 100 may be used in other embodiments.

Figure 3:
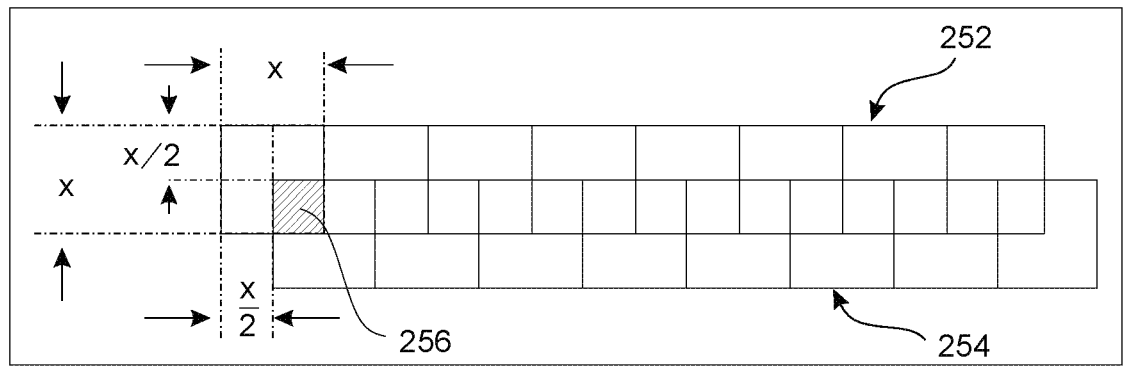
FIG. 3 is a schematic diagram of the imaging sensor components of the image acquisition device as shown in FIG. 1.

FIG. 3 is a schematic diagram illustrating the effect of the diagonal half-pixel shift between the array 204 and the array 206 on captured images. Images 252 and 254 represent images captured by the two diagonal half-pixel shifted (x/2) detector arrays 204 and 206. Each of the images 252 and 254 is comprised of eight pixels. The shaded area 256 denotes an area of overlap between a first pixel in image 252 and a first pixel in image 254. By combining the information from the images 252 and 254 in accordance with the methods of the present disclosure described in more detail below, a super-resolution may be generated.

Figure 4:
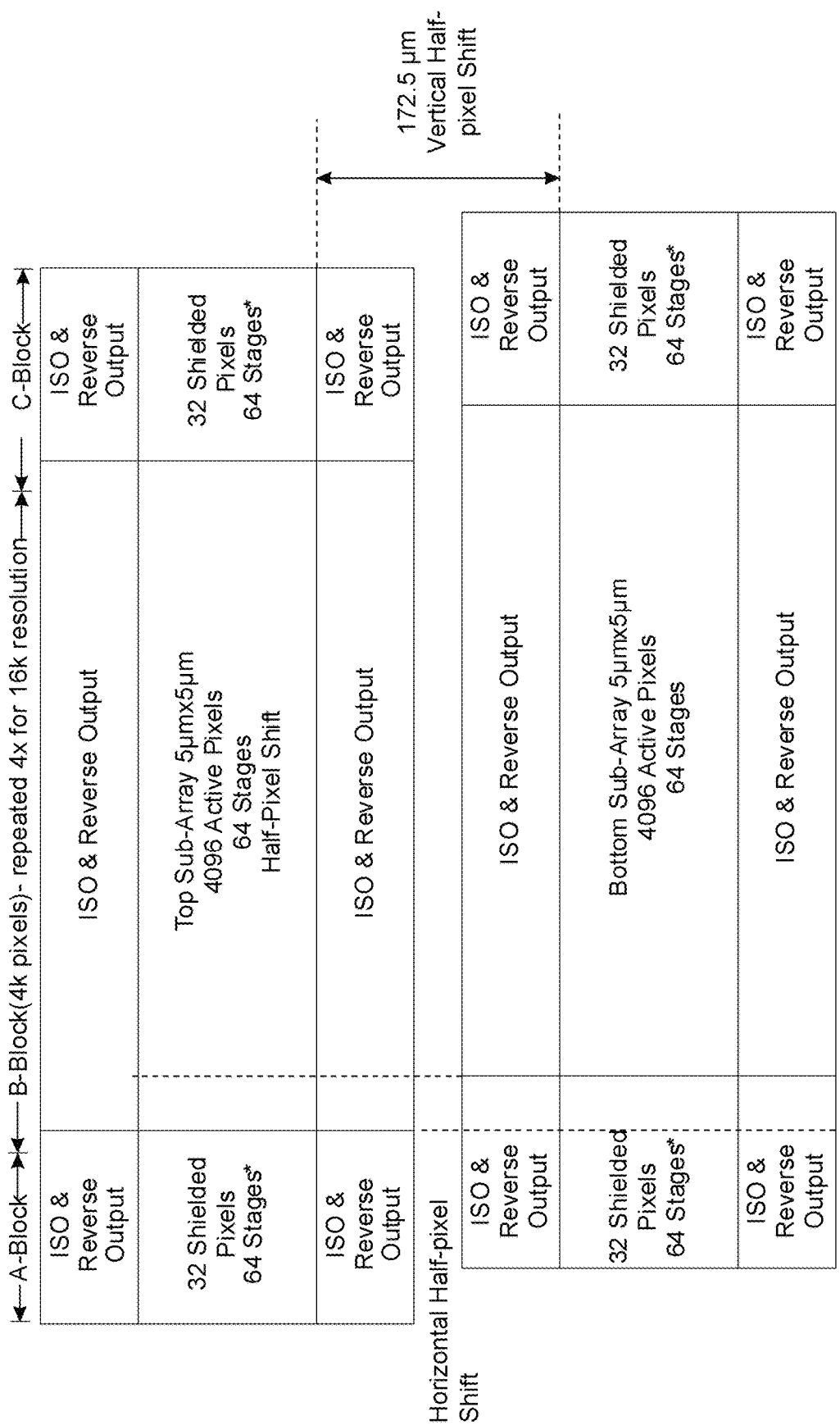
FIG. 4 is a schematic diagram illustrating a sensor pixel array arrangement in accordance with another example embodiment of the present disclosure.

FIG. 4 is a sensor pixel array arrangement of a sensor in accordance with another example embodiment of the present disclosure. The sensor design of FIG. 4 is similar to the sensor design of FIG. 2 expect that the resolution of the sensor design of FIG. 4 is 4K and the resolution of the sensor design of FIG. 2 is 16K. The sensor contains 2 pixel-shift arrays with 5 μm pixels. The top and bottom arrays have 64 stages each, and pixels in the top array are shifted 2.5 μm (½ pixel) horizontally and 2.5 μm (½ pixel) vertically comparing to pixels in the bottom array. Hence, two images shifted with sub-pixel precision are captured with the sensor.

Figure 5:
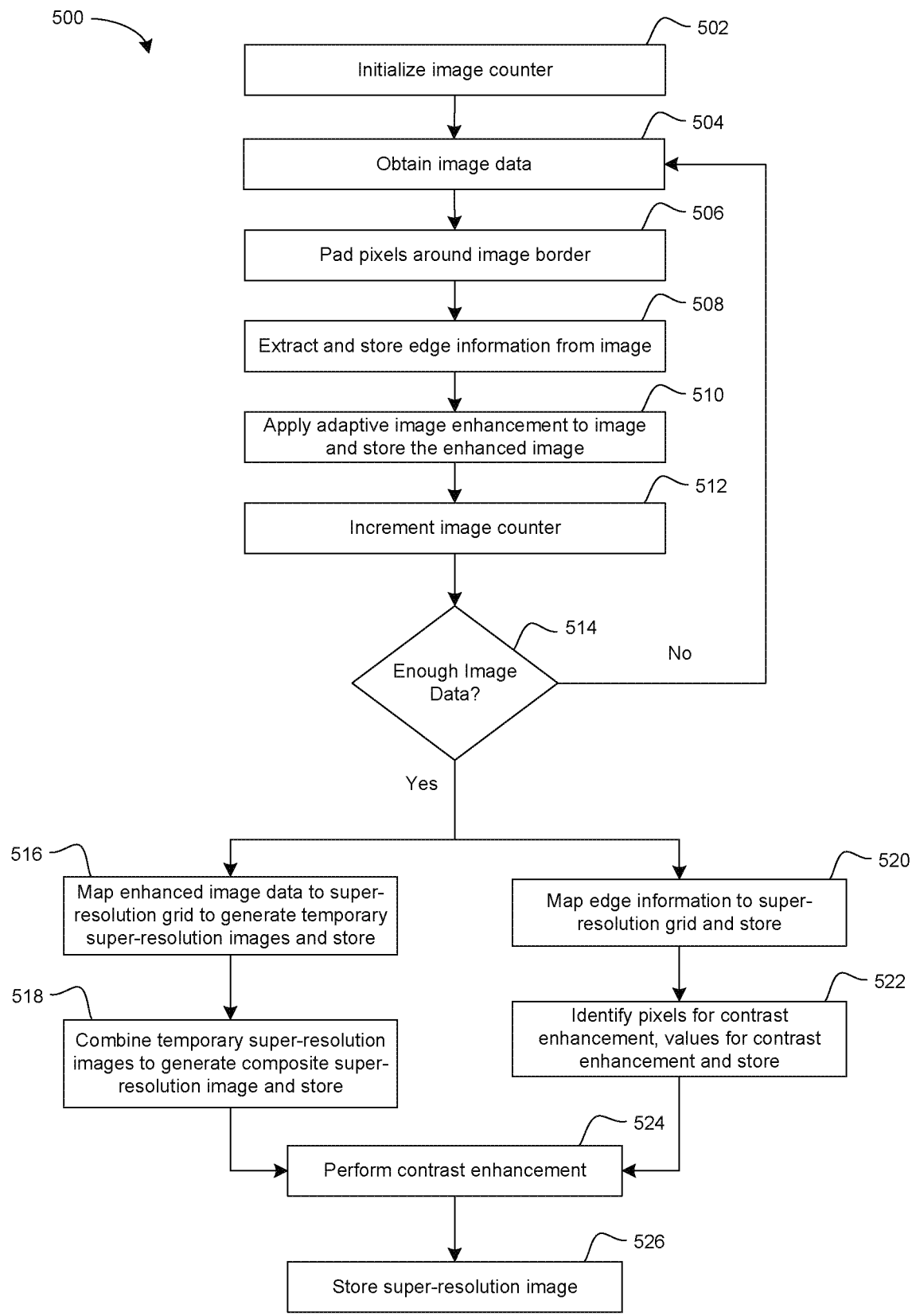
FIG. 5 is a flowchart of a method for generating a super-resolution image in accordance with one example embodiment of the present disclosure.

FIG. 5 is a flowchart of a method 500 for generating a super-resolution image from two low-resolution images in accordance with one example embodiment of the present disclosure. The method 500 may be carried out by software executed, for example, by a processor, which may be a processor of an image acquisition device such as the line scan camera 100 illustrated in FIG. 1. Alternatively, the method 500 may performed by a separate processing unit distinct from an image acquisition device.

At operation 502, the processor 102 of the line scan camera 100 initializes an image counter, denoted n, at 1.

At operation 504, image data is obtained, for example, from the memory of the line scan camera 100. Each image has a resolution of dimension width (W)×height (H). The image is stored in memory, for example, as LR(n).

At operation 506, pixel padding is performed around the image border for the image LR(n). The size of the padding may vary and may depend on factors such as the parameters of edge detection algorithms (e.g., Sobel operator) and smoothing algorithms (e.g., Gaussian filter) used, as described more fully below. The pixel padding may be performed using any suitable method, many of which are known in the art, such as mirroring. For example, a 2-pixel padding may be used for a 5×5 Sobel and/or Gaussian kernel size.

At operation 508, edge information is extracted from the image LR(n) and stored in memory, for example, as LREdge(n). At operation 510, the image LR(n) is adaptively enhanced and stored in memory, for example, as LREnhance(n). The operations 508 and 510 may be performed by a common algorithm which, in some examples, is a function adaptiveEnhance( ) described below. The enhanced image output from function adaptiveEnhance( ) is stored as LREnhance(n), and edges output from function adaptiveEnhance( ) is stored as LREdge(n).

At operation 512, the image counter is incremented by 1. At operation 514, the processor determines whether two low-resolution images have been processed by determining whether the image counter is greater than 2. If two low-resolution images have not been processed (i.e., only one low-resolution image has been processed as determined by the value of the image counter being less than or equal to 2), the method returns to operation 504.

When two low-resolution images have been processed (as determined by the value of the image counter being greater than 2), the method 500 proceeds to combine the enhanced image information and the edge information at operations 516 and 520 respectively.

Figure 7A:
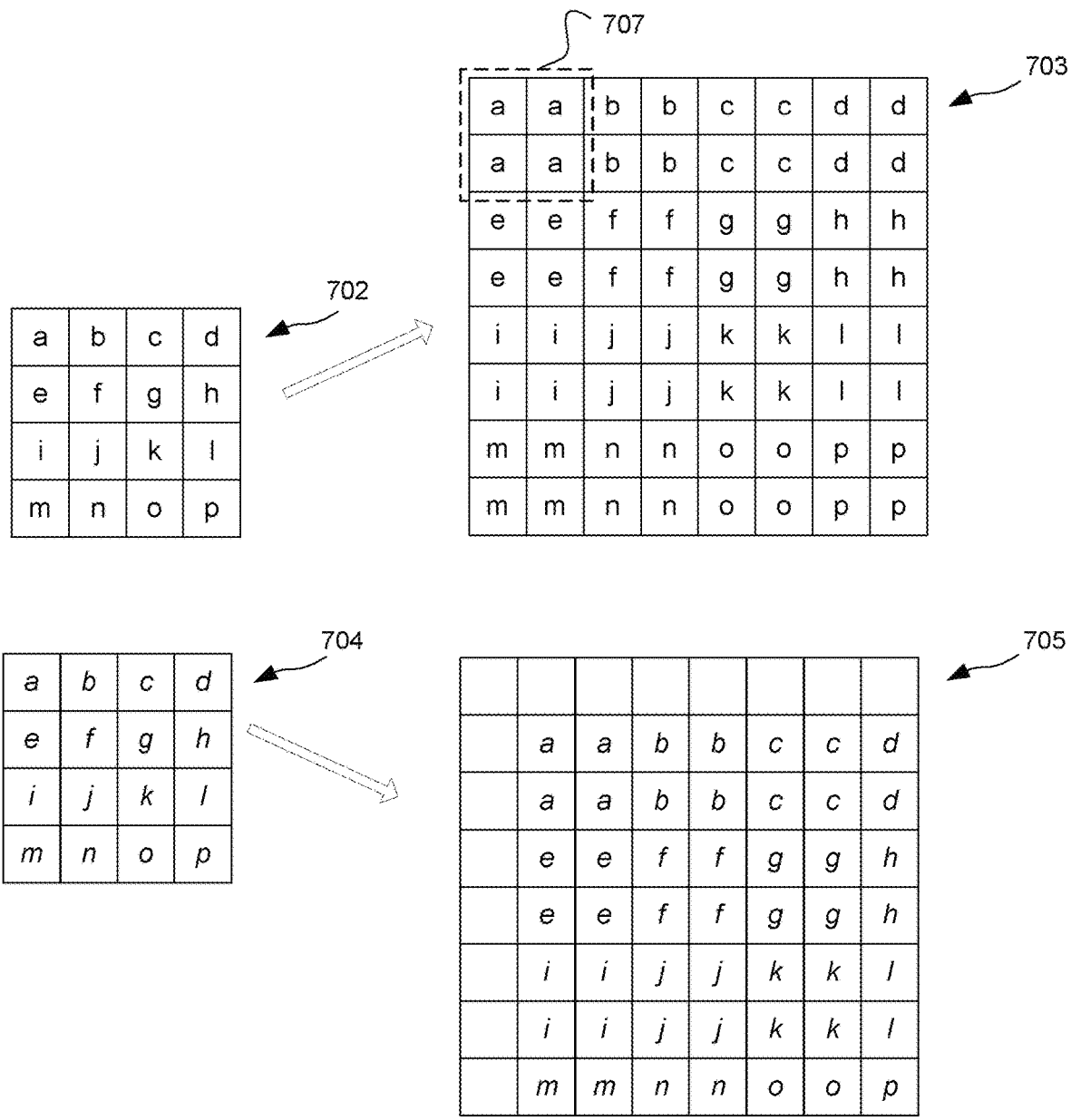
FIG. 7A is a schematic diagram illustrating pixel mapping from a low-resolution grid to a super-resolution grid in accordance with one example embodiment of the present disclosure.

At operation 516, a first enhanced image 702 ("LR1") and a second enhanced image 704 ("LR2"), the enhanced images LREnhance(1) and LREnhance(2) described above, are each non-uniformly mapped on to a super-resolution grid with a resolution that is double the resolution of the first and second low-resolution images, a dimension 2 W×2H, wherein W and H are the width and height of the low-resolution images respectively. The two mapped images on the super-resolution grid that are generated from the first and second enhanced images 702 and 704 are stored in memory, for example, as SR_tmp1 and SR_tmp2, respectively. This results in two intermediate super-resolution images. Each super-resolution image contains two times as many pixels as the low-resolution images. As a result, each individual pixel in the enhanced low-resolution images are non-uniformly duplicated four times to form a 2×2 kernel as shown in FIG. 7A. In FIG. 7A, the first low-resolution image 702 is used to generate a first super-resolution 703, and the second low-resolution image 704 is used to generate a second super-resolution 705. The 2×2 kernel in the upper left corner of the first super-resolution 703, represented by reference 707, is the pixel "a" from the first low-resolution image 702 duplicated four times.

At operation 518, the two intermediate super-resolution images are combined, for example, by bilinear stacking, to generate a composite super-resolution image which is stored in memory, for example, as SR_tmp. The combined enhanced image on the SR grid is computed as follows:

$$SR\_tmp = \frac{1}{2}*(SR\_tmp1 + SR\_tmp2)$$

Figure 7B:
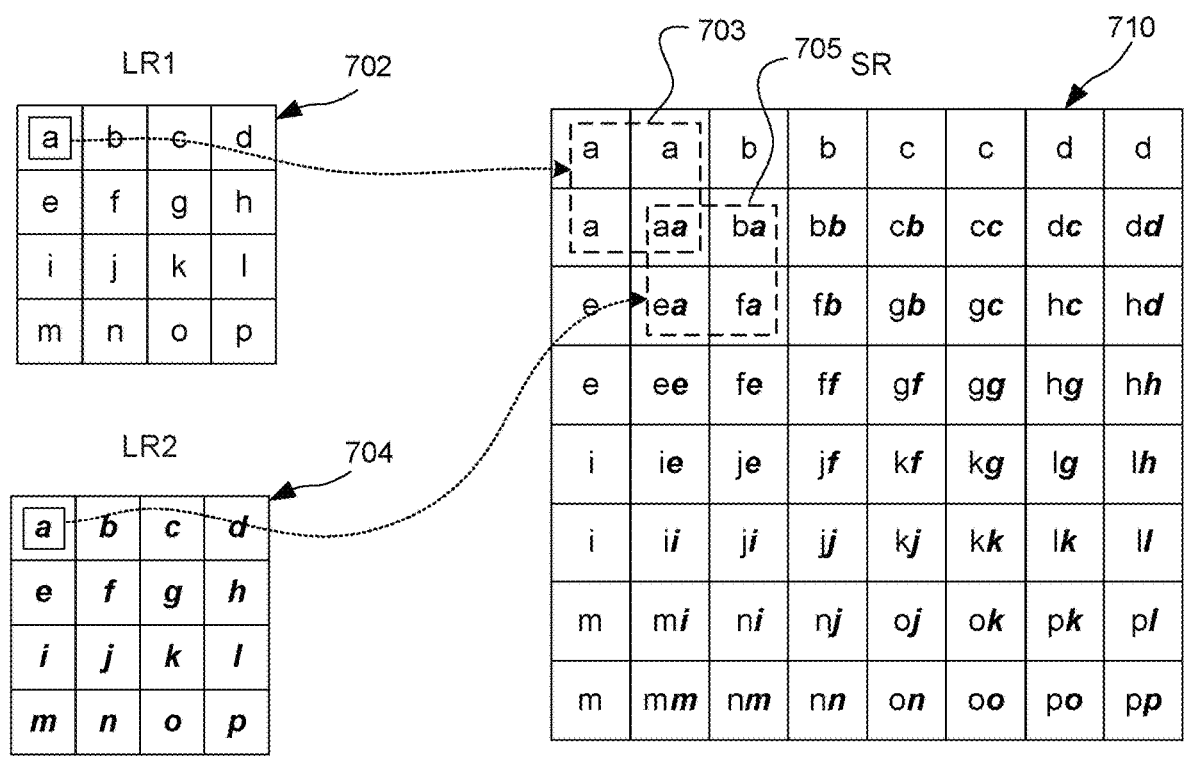
FIG. 7B is a schematic diagram illustrating a composite super-resolution image generated in accordance with one example embodiment of the present disclosure.

It is noted that the image grids of the intermediate super-resolution images are offset by one pixel. However, as each 2×2 kernel is comprised of duplicates of the same pixel in the original low-resolution image, a one pixel shift in the super-resolution images reflects the half-pixel diagonal shift in the sensor array used to capture the first and second low-resolution images as described above. FIG. 7B illustrates a composite super-resolution image 710 generated from the second super-resolution image 705 and the first super-resolution image 703. As shown in FIG. 7B, the non-uniform mapping and the bilinear stacking provide that each pixel in the composite super-resolution image 710 does not contain duplicate pixel information except for those at the upper row and the left-most column.

At operation 520, the edge information from operation 508 for each of the first and the second low-resolution images is mapped onto a super-resolution grid with a resolution that is double the resolution of the first and second low-resolution images, a dimension 2 W×2H, wherein W and H are the width and height of the low-resolution images respectively. Similar methods to those performed on the enhanced images to generate the intermediate super-resolution at operation 516 may be used. The resulting super-resolution edge information, in the form of two super-resolution grids, are stored in memory, for example, as SR_edge1 and SR_edge2.

At operation 522, the processor 102 identifies sub-pixel defects in the captured low-resolution images for contrast enhancement in the composite super-resolution image 710 generated at operation 518 and the amount of enhancement of contrast enhancement to highlight or emphasize the identified detects in the final image. In some examples, this operation is performed by a function postConstrastEnh( ) using the super-resolution edge information SR_edge1 and SR_edge2 as inputs. The output of the function postConstrastEnh( ) is enhanced super-resolution edge information is stored in memory, for example, as SR_edge.

Although the operations 516 and 518 are shown as being performed concurrently with the operations 520 and 522 in the method 500 of FIG. 5, in other embodiments these operations could be performed in order rather than concurrently. Examples of an order of the operations are 516, 518, 520 and 522 and 520, 522, 516 and 518.

At operation 524, a contrast enhancement algorithm is performed on the composite super-resolution image SR_tmp using the enhanced super-resolution edge information SR_edge in accordance with the following equation:

$$SR = SR\_tmp + K * SR\_edge$$

wherein K is a control factor determined by a noise floor of the image acquisition device (e.g., line scan camera 100), wherein the value of K is between 0 and 1. An example of a value of K for a particular image acquisition device is 0.35.

At operation 526, the contrast restored super-resolution image is stored in memory.

Figure 6A:
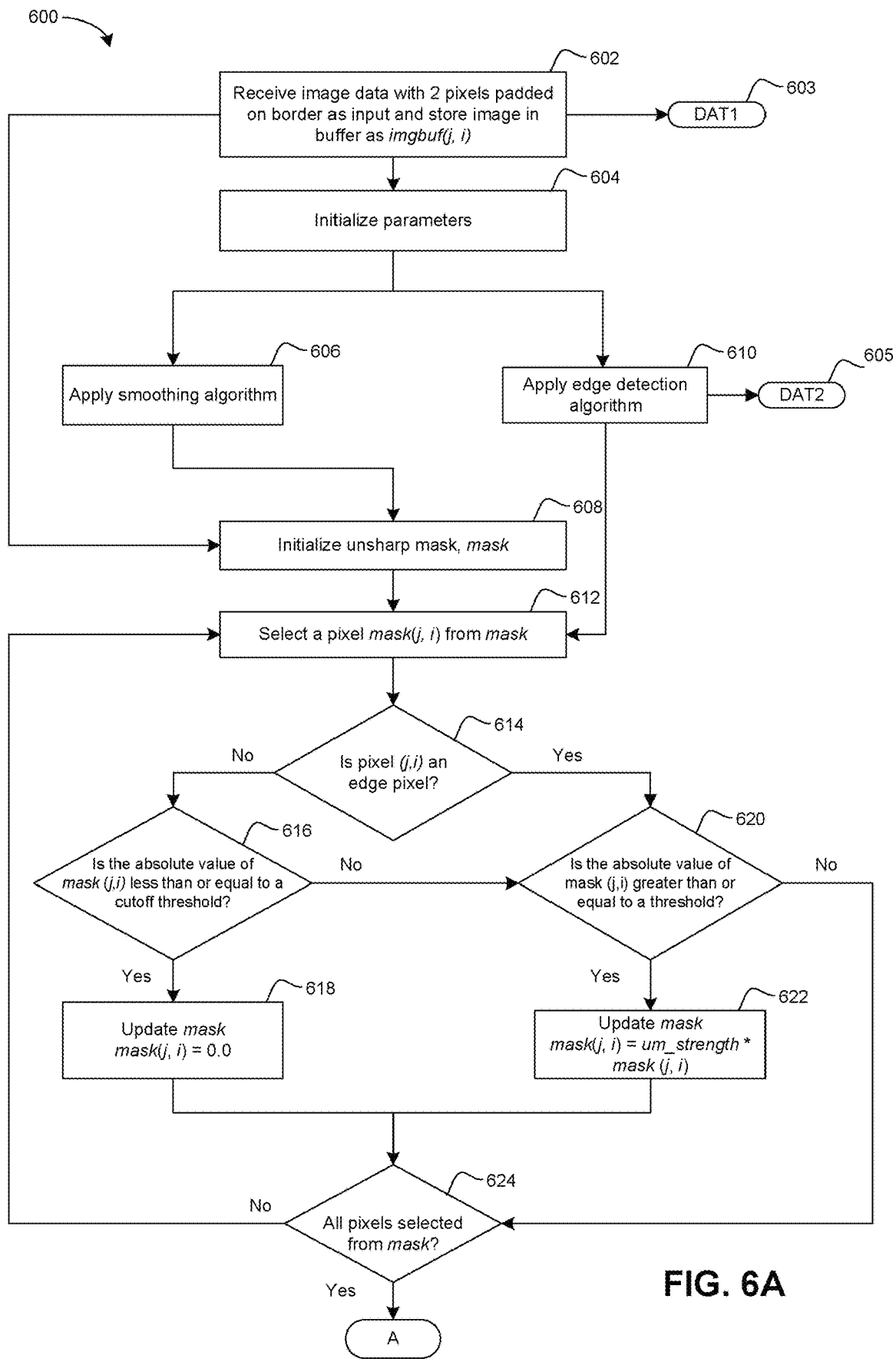
FIGS. 6A and 6B illustrate a flowchart of a method for extracting edge information and adaptively enhancing an image in accordance with one example embodiment of the present disclosure.
Figure 6B:
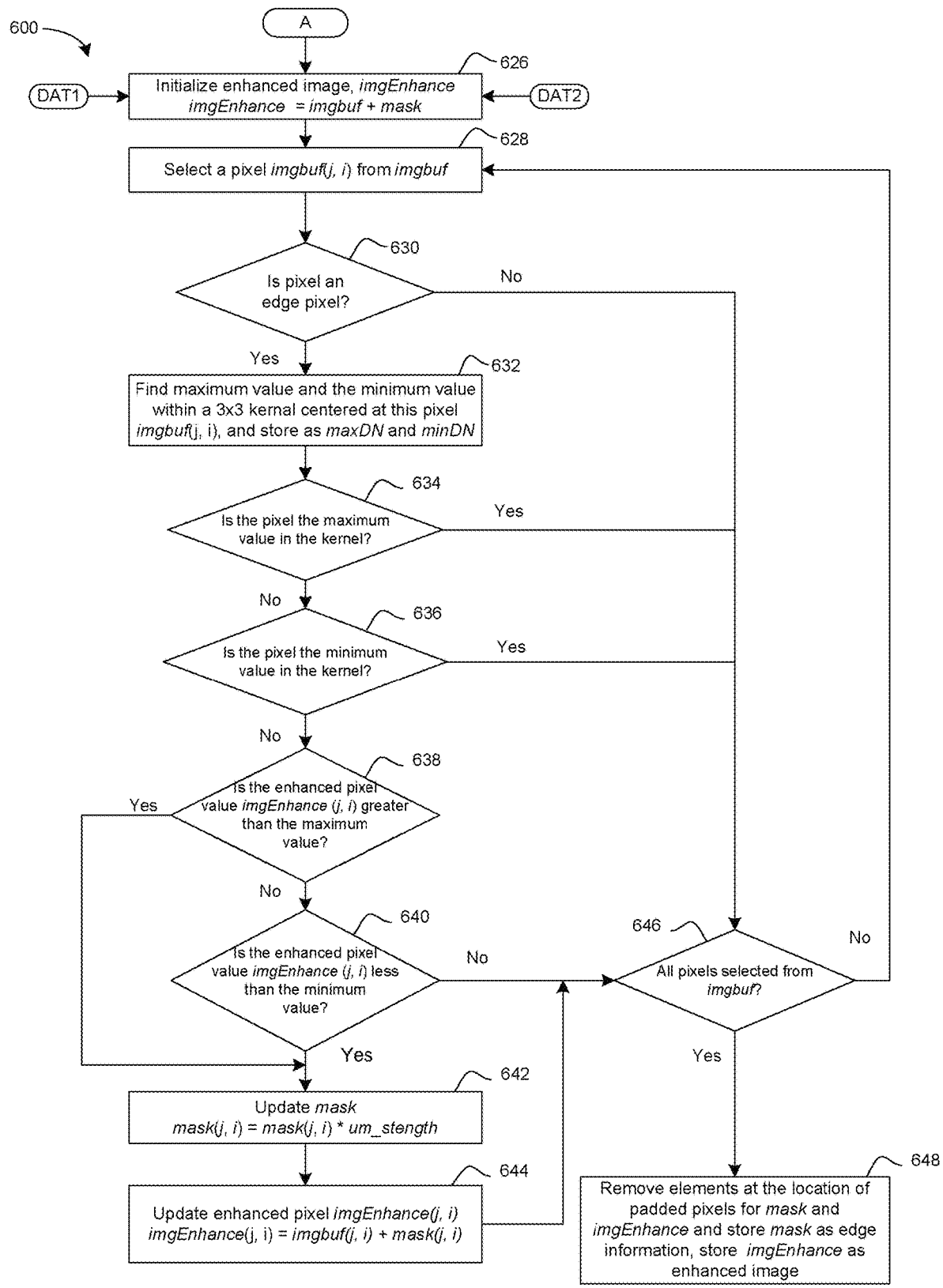

FIGS. 6A and 6B illustrate a flowchart of a method 600 for extracting edge information and adaptively enhancing an image in accordance with one example embodiment of the present disclosure. The method 600 performs the function adaptiveEnhance( ) described above in connection with operations 508 and 510. The method 600 may be carried out by software executed, for example, by a processor, which may be a processor of an image acquisition device such as the line scan camera 100 illustrated in FIG. 1. Alternatively, the method 600 may performed by a separate processing unit distinct from an image acquisition device. The method 600 is typically performed by the same processor as the method 500 described above.

At operation 602, image data for LR(n) with pixels added at the border are received as input and stored in memory, for example, as imgbuf(j,i), wherein j and i are iteration variables for traversing and accessing individual pixels in imgbuf, with j>=1 and j<=Hp, i>=1 and i<=Wp, wherein Hp=H+the number of added pixels and Wp=W+the number of added pixels, and W and H represent the width and height of the spatial resolution of the low-resolution images, respectively.

At operation 603, the imgbuf is output for use in later processing as described more fully below.

At operation 604, the processor 102 initializes a number of control variables. Control variable values may be set based on a number of factors, such as noise floor, simulation results, functional limitations of the image acquisition device (e.g., image sensor characteristics), such as the line scan camera 100, etc. In some embodiments, the initialized control variables comprise an edge detection threshold threshold_sobel, and enhancement threshold, um_threshold, an enhancement factor um_strength, and an enhancement cutoff threshold um_threshold_cut. In one example in which 8-bit images are processed, the variable threshold_sobel may be set at 30, the variable um_threshold may be set at 10, the variable um_strength may be set at 0.3, and the variable um_threshold_cut may be set at 2.

At operation 606, an image smoothing algorithm is applied to the image to generate a smoothed image. The image smoothing algorithm at least partially reduces the effects of the high frequency components of the image. Each pixel value in imgbuf(j,i) is set to be a weighted average of its surrounding pixel values. As noted above, the parameters of the smoothing algorithms (e.g., size of the Gaussian blur filter or kernel) may affect the size of the pixel padding at operation 506. Because the image smoothing algorithm produces a pixel value based on the weighted average of surrounding pixels, for pixels that do not have surrounding pixels (i.e., pixels along the outer edges of an image), pixel padding is required.

An example of a suitable smoothing algorithm that may be used in some embodiments is a blur filter such as, for example, a Gaussian blur filter. Other image smoothing algorithms can be used in other embodiments. An example of a Gaussian blur filter that may be used in some embodiments has a radius of 1.0 and sigma of 1.5 and may be applied to on imgbuf(r, c), wherein r and c ranges in values that iterate through the image pixels while avoiding the padded pixels, wherein r=3 to Hp-2, c=3 to Wp-2 if padding 2 pixels at the border. The result of the image smoothing algorithm is stored in memory, for example, as gaussImg. The value of non-filtered pixels (i.e., padded pixels) is set to 0.

The Gaussian blur filter is selected based on processing speed and noise level among other factors. Different parameters may be used in other examples. An example of a Gaussian blur filter and its application will now be described. An example of a Gaussian blur filter is shown below:

$$\begin{bmatrix} 0.0947416 & 0.118318 & 0.0947416 \\ 0.118318 & 0.147761 & 0.118318 \\ 0.0947416 & 0.118318 & 0.0947416 \end{bmatrix}$$

A Gaussian blur filter kernel, denoted gc, is initialized with Gaussian constants shown above. The Gaussian kernel gc is convoluted with imgbuf (j,i) to generate a matrix gaussImg (y, x) based on the following equation:

$$gaussImg(y,x)=\Sigma_{j=y-1}^{y+1}(\Sigma_{i=x-1}^{x+1},DN(j,i)*gc[j-y+1][i-x+1])$$

If the pixel value for a given pixel in gaussImg(y,x) exceeds the maximum value that can be presented by the number of bits per pixel, the pixel value is set to be the maximum value (i.e., if gaussImg(y, x)>maxval, set gaussImg(y, x)=maxval, wherein maxval=maximum pixel intensity (e.g., 255 for 8-bit images and 4095 for 12-bit images). The foregoing steps are repeated until all pixels in imgbuf (j,i), with the exception of the padded pixels, have been processed.

At operation 608, an unsharp mask is initialized by the following equation:

$$mask=imgbuf-gaussImg$$

The unsharp mask records the basic high frequency information of the original image. It will be classified and revised in the following operations 612 to 642.

At operation 610, an edge detection method is applied to imgbuf(j,i). One example of a suitable edge detection method that may be used in some embodiments is a Sobel operator, also known as a Sobel-Feldman operator or Sobel filter. Other edge detection methods can be used in other embodiments.

An example of a Sobel operator and its application will now be described. The Sobel operator includes two convolution kernels, with one typically being the other rotated by 90°. As is known in the art, the Sobel kernels are designed to respond how abruptly or smoothly the pixel intensity changes running in the vertical and horizontal direction relative to the pixel grid with one kernel for each of the two orientations. An example of a Sobel operator (kernel) for the horizontal direction is shown below:

$$\begin{bmatrix} -1 & 0 & 1 \\ -2 & 0 & 2 \\ -1 & 0 & 1 \end{bmatrix}$$

An example of a Sobel operator (kernel) for the vertical direction is shown below:

$$\begin{bmatrix} -1 & -2 & -1 \\ 0 & 0 & 0 \\ 1 & 2 & 1 \end{bmatrix}$$

The gradient of image intensity at a pixel may be determined by the convolution of the pixel value with each of the two Sobel kernels, which may be combined to yield the absolute magnitude and orientation of the gradient. The image imgbuf(j,i) is convoluted with each of Sobel kernels with the following two equations:

$$DN\_filtx(y,x)=\Sigma_{j=y-1}^{y+1}(\tau_{i=x-1}^{x+1}DN(j,i)*sobelx[j-y+1][i-x+1])$$

$$DN\_filty(y,x)=\Sigma_{j=y-1}^{y+1}(\Sigma_{i=x-1}^{x+1}DN(j,i)*sobely[j-y+1][i-x+1])$$

wherein sobelx[ . . . ] and sobely[ . . . ] denote the horizontal Sobel operator kernel and vertical Sobel operator kernel, respectively, and DN_filtx(y,x) and DN_filty(y,x) are the resulting matrices. For a pixel DN(y, x) in an image, wherein y is the number of rows and x is the number of columns, horizontal changes are calculated by DN_filtx(y, x) and the vertical changes are calculated by DN_filty(y, x).

Next, the "edge" at pixel DN(y, x) is calculated using the horizontal and vertical edge information contained in matrices DN_filtx(y,x) and DN_filty(y,x) in accordance with the following equation:

$$sobelEdge(y,x)=\sqrt{DN\_filtx(y,x)^2+DN\_filty(y,x)^2}$$

Next, the resulting matrix sobelEdge(y,x) is converted to a binary image based on pixel value comparison with a pre-determined threshold value threshold_sobel as follows:
  if sobelEdge(y, x)<=threshold_sobel set sobelEdge(y,x)=0 otherwise, set sobelEdge(y,x)=1

The foregoing steps are repeated until all pixels of imgbuf (j,i) are processed. When all pixels of imgbuf(j,i) are processed, the resulting matrix is stored into memory, for example, as sobelEdge. The value of non-filtered pixels (i.e., padded pixels) is set to 0.

At operation 605, the edge information matrix sobelEdge is output for use in later processing as described more fully below.

Next, in operations 612-624, the parameters of the unsharp mask mask are classified and revised using the extracted edge information, such as edge information matrix sobelEdge. At operation 612, an individual pixel value in the unsharp mask mask is selected.

At operation 614, it is determined whether the selected pixel in the unsharp mask is an edge pixel by checking the corresponding pixel value in the extracted edge information, e.g. when sobelEdge, for examples, is the value of sobelEdge(j, i) equal to 1?). When the selected pixel does correspond to an edge pixel, processing proceeds to operation 620.

At operation 620, a determination is made as to whether the absolute value of the selected mask pixel mask(j,i) is greater than or equal to a pre-determined unsharp mask enhancement threshold um_threshold (e.g., abs(mask(j, i))>=um_threshold?), which may vary between examples as described above. When the absolute value is greater than or equal to the enhancement threshold, processing proceeds to operation 622 at which the mask pixel value is updated in accordance with the following equation:

$$mask(j,i)=um\_strength*mask(j,i)$$

When the absolute value of the selected mask pixel is less than the enhancement threshold, the selected mask pixel value is left unchanged.

When the selected pixel does not correspond to an edge pixel, processing proceeds to operation 616 at which a further determination is made as to whether the absolute value of the selected mask pixel mask(j,i) is less than or equal to a pre-determined unsharp mask enhancement cutoff threshold um_threshold_cut (e.g., abs(mask(j, i))<=um_threshold_cut?), which may vary between examples as described above. When the absolute value is not less than or equal to the enhancement cutoff threshold, processing proceeds to operation 620 for further determination. When the absolute value is less than or equal to the enhancement cutoff threshold, processing proceeds to operation 618 at which the mask pixel value is set to 0 (i.e, mask(j, i)=0.0).

At operation 624, a determination is made whether all of the pixels in the unsharp mask mask have been processed. If not, processing proceeds to operation 612. If so, proceeding proceeds to operation 626 at which an enhanced image imgEnhance is initialized using imgbuf output from operation 603 and the unsharp mask mask output from operation 624 in accordance with the following equation:

imgEnhance=imgbuf+mask.

At operation 628, a pixel at U, i) of imgbuf, i.e. imgbuf (j,i), is selected, wherein iteration variables j and i range from 3 to Hp-2 and 3 to Wp-2, respectively, if padding 2 pixels at the border so that all pixels in original image, without the padded pixels, may be iterated through.

At operation 630, it is determined whether the selected pixel in the imgbuf is an edge pixel by checking the corresponding pixel value in the extracted edge information, e.g. when sobelEdge, for examples, is the value of sobelEdge(j, i) equal to 1?). When the selected pixel does not correspond to an edge pixel, the pixel value in the enhanced image, imgEnhance(j,i), and the mask value, mask (j,i), are maintained without change and processing proceeds to operation 646.

When the selected pixel is an edge pixel, processing proceeds to operation 632 at which the processor 102 locates a local maximum value and a local minimum value of a 3×3 kernel centred around the selected pixel imgbuf(j,i). The maximum value and minimum value values are stored into memory 109 as denoted by maxDN and minDN, respectively.

At operation 634, the processor 102 determines whether the selected pixel value equals to the local maximum value determined at operation 632 (e.g., is imgbuf(j, i)=maxDN?). If so, the selected pixel value is maintained without change and processing proceeds to operation 646. If no, processing proceeds to operation 636.

At operation 636, the processor 102 determines whether the selected pixel value is equal to the local minimum value determined at operation 632 (e.g., imgbuf(j, i)=minDN?). If so, the selected pixel value is maintained without change and processing proceeds to operation 646. If no, processing proceeds to operation 638.

At operation 638, the processor 102 determines whether the value of the corresponding pixel in the enhanced image imgEnhance U, i) is greater than the local maximum value determined at operation 632 (e.g., imgEnhance U, i)>maxDN?). If so, the processing proceeds to operation 642 at which the value of the corresponding pixel in mask is updated in accordance with the following equation:

mask($j,i$)=mask($j,i$)*$um\_strength$

Alternatively, when the value of the enhanced image is not greater than the local maximum value, processing proceeds to operation 640 at which further determination is made regarding whether the enhanced image pixel imgEnhance U, i) is less than the local minimum value (imgEnhance U, i)<minDN?). If so, processing proceeds to operation 642 at which the value of the corresponding pixel in mask is updated as described above. If no, the selected pixel value is maintained without change and processing proceeds to operation 646.

At operation 644, any pixel in the mask that was updated at operation 642, the enhanced image pixel value is revised in accordance with the following equation:

imgEnhance($j,i$)=imgbuf($j,i$)+mask($j,i$)

At operation 646, a determination is made whether all of the pixels in imgbuf have been processed. If not, processing proceeds to operation 628 at which a new pixel is selected. If so, proceeding proceeds to operation 648 at which any pixels at the location of the padded pixels for both of the unsharp mask mask and enhanced image imgEnhance are removed. The resultant enhanced image imgEnhance is stored in memory, for example, as enhanced image (size: W×H, wherein W and H represent the width and height of the spatial resolution of the low-resolution images), and the unsharp mask is stored in memory, for example, as edges (size: W×H, wherein W and H represent the width and height of the spatial resolution of the low-resolution images).

Figure 8:
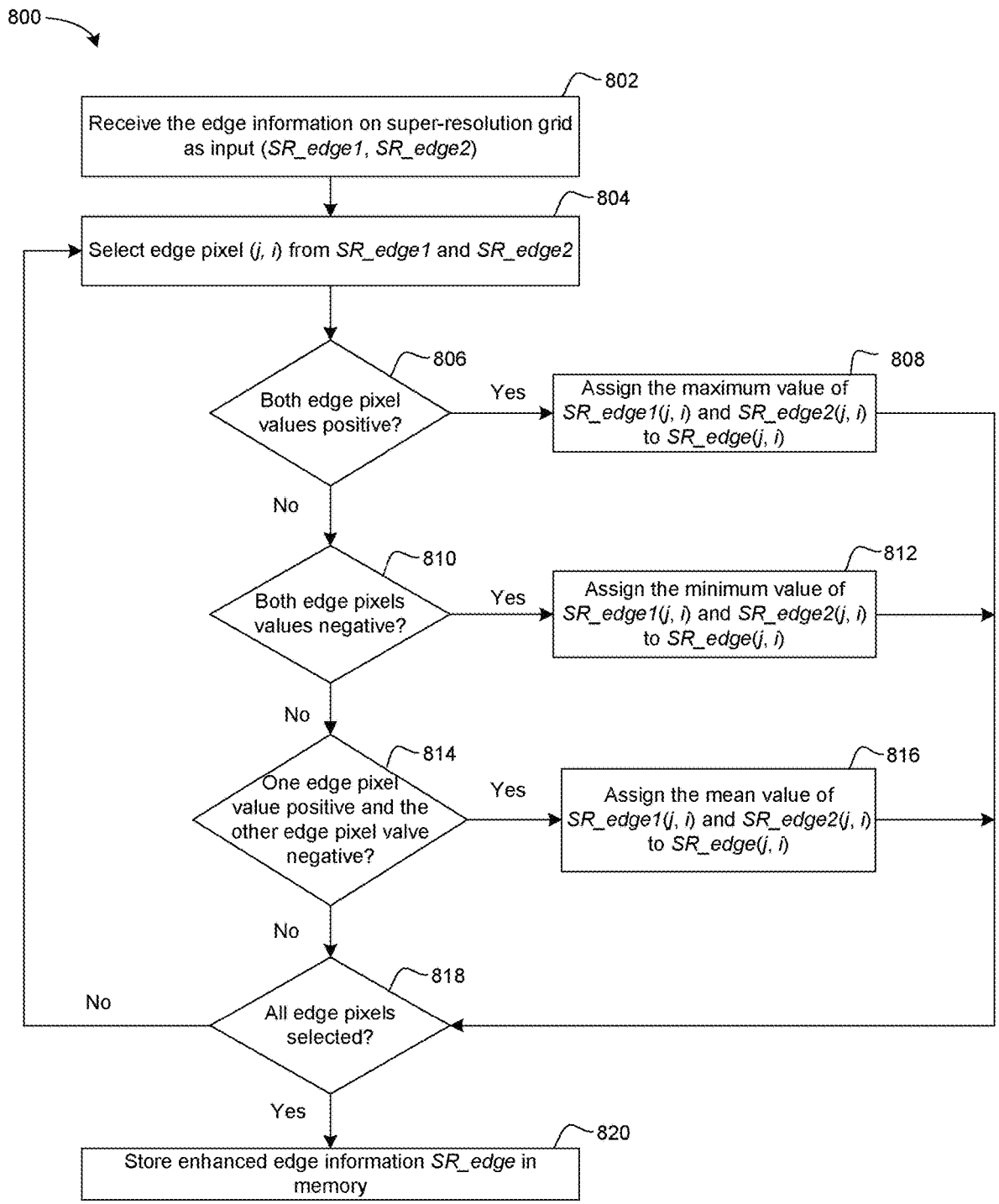
FIG. 8 is a flowchart of a method for contrast enhancement in accordance with one example embodiment of the present disclosure.

FIG. 8 illustrates a flowchart of a method 800 for contrast enhancement in accordance with one example embodiment of the present disclosure. The method 800 performs the function postConstrastEnh( ) described above in connection with operation 522. The method 800 may be carried out by software executed, for example, by a processor, which may be a processor of an image acquisition device such as the line scan camera 100 illustrated in FIG. 1. Alternatively, the method 800 may performed by a separate processing unit distinct from an image acquisition device. The method 800 is typically performed by the same processor as the methods 500 and 600 described above.

At operation 802, the super-resolution edge information SR_edge1 and SR_edge2 generated at operation 520 of the method 500 are received as input to method 800.

At operation 804, a pixel element U, i) from SR_edge1 and SR_edge2 are selected, wherein j>=1 and j<=2H and i>=1 and i<=2 W, wherein W and H represent the width and height of the spatial resolution of the low-resolution images, respectively.

At operation 806, it is determined whether both edge pixel values are positive, i.e. SR_edge1($j$, $i$)>0 and SR_edge2($j$, $i$)>0? When both edge pixel values are not positive, processing proceeds to operation 810. When both edge pixel values are positive, processing proceeds to operation 808 at which the maximum value of SR_edge1($j$, $i$) and SR_edge2($j$, $i$) is added to an enhanced super-resolution edge information grid (SR_edge(j, i)=max (SR_edge1($j$, $i$), SR_edge2($j$, $i$)).

At operation 810, it is determined whether both edge pixel values are negative, i.e. SR_edge1($j$, $i$)<0 and SR_edge2($j$, $i$)<0? The values of the edge pixels may be defined by a signed floating point number. For an 8-bit image, the value may range between −255 and +255. When both edge pixel values are not negative, processing proceeds to operation 814. When both edge pixel values are negative, processing proceeds to operation 812 at which the minimum value of SR_edge1($j$, $i$) and SR_edge2($j$, $i$) is added to an enhanced super-resolution edge information grid (SR_edge (j, i)=min (SR_edge1($j$, $i$), SR_edge2($j$, $i$)).

At operation 814, it is determined whether one edge pixel value is positive and the other edge pixel value is negative, i.e. SR_edge1($j$, $i$)<0 and SR_edge2($j$, $i$)>0) or (SR_edge1($j$, $i$)>0 and SR_edge2($j$, $i$)<0? When this condition is not met, processing proceeds to operation 818. When this condition is met, processing proceeds to operation 816 at which the average/mean value of SR_edge1($j$, $i$) and SR_edge2($j$, $i$) is added to an enhanced super-resolution edge information grid (SR_edge(j, i)=mean (SR_edge1($j$, $i$), SR_edge2($j$, $i$))).

At operation 818, a determination is made whether all of the pixels in the SR_edge1 and SR_edge2 have been processed. If not, processing proceeds to operation 804. If so, processing proceeds to operation 820 at which enhanced super-resolution edge information grid is stored in memory, for example, as SR_edge.

Figure 9A:
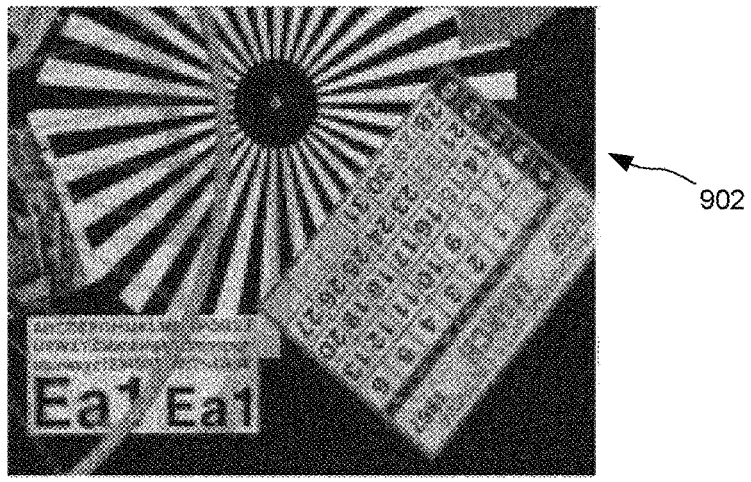
FIGS. 9A-F illustrate example images processed in accordance with an example embodiment of the method of the present disclosure.
Figure 9B:
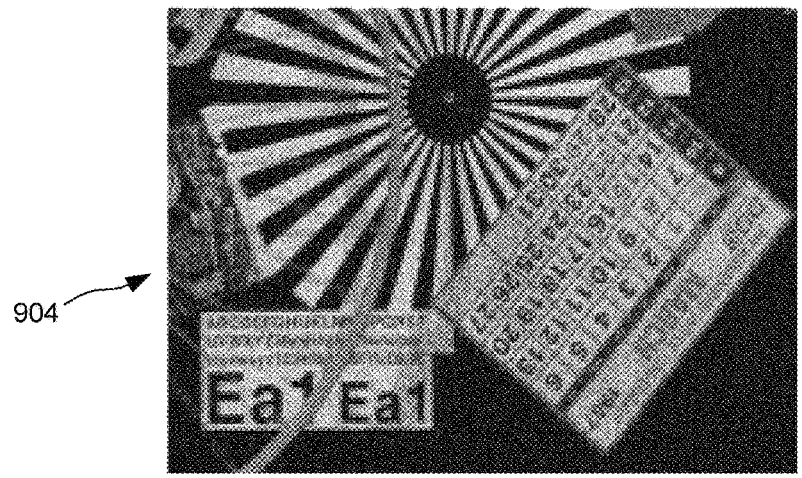
Figure 9C:
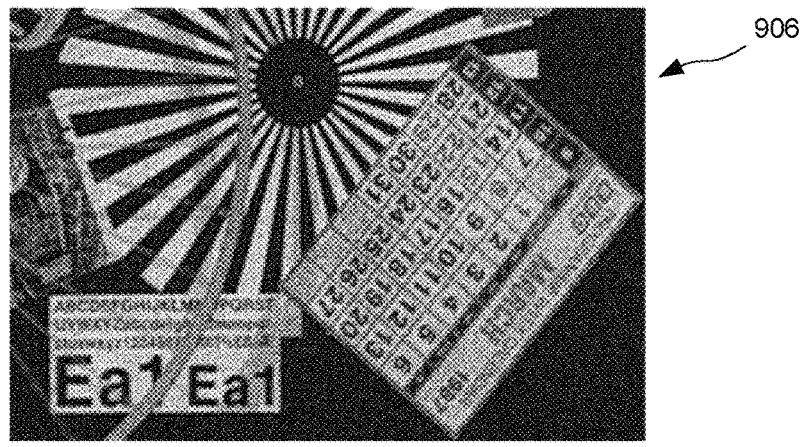
Figure 9D:
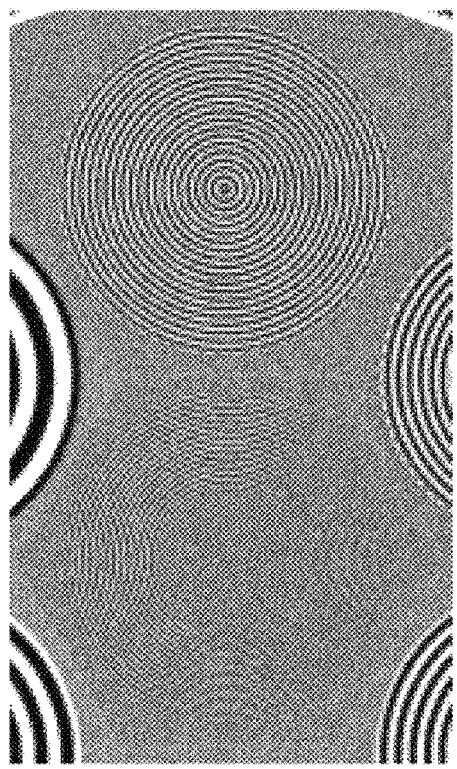
Figure 9E:
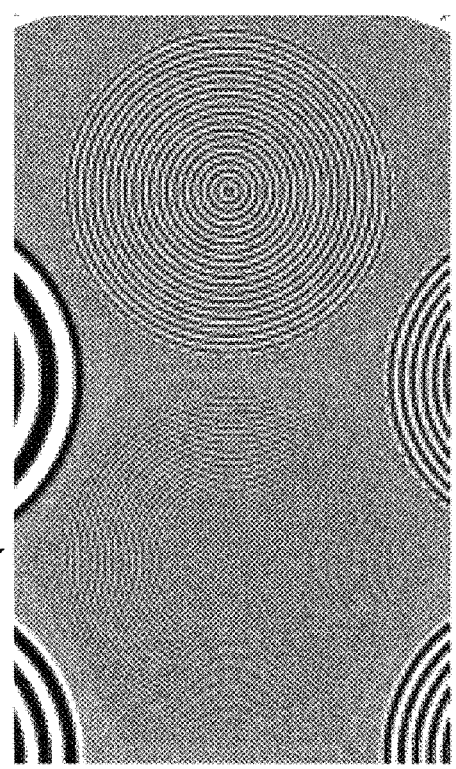
Figure 9F:
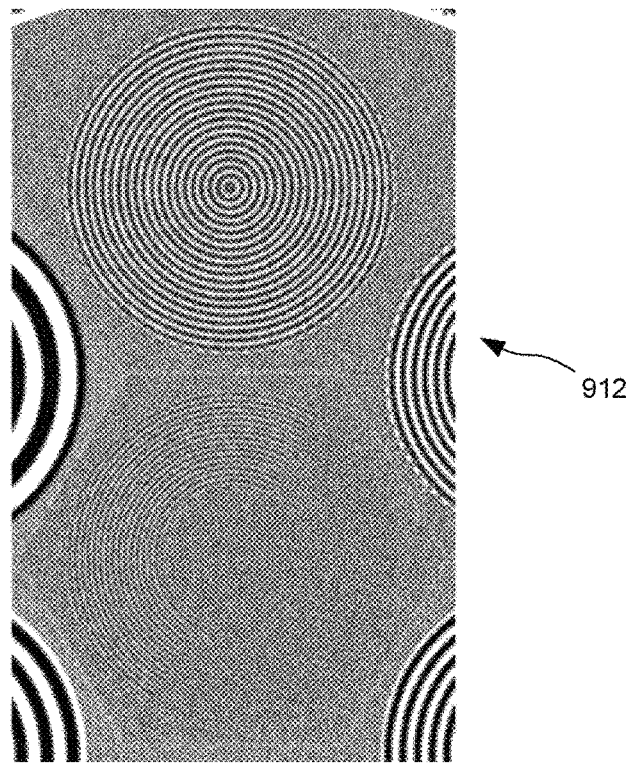

FIGS. 9A-F illustrate example images processed in accordance with an example embodiment of the method of the present disclosure. Image 902 is created by a 2:1 down-sampling of a high-resolution image, and image 904 is created by a 2:1 down-sampling of the same high-resolution image with one pixel shift diagonally. To model sensor point spread function (PSF), a spatial average operator is used in down-sampling. In this way, two aliased low-resolution images 902 and 904 in FIGS. 9A and 9B respectively are obtained with the image 904 diagonally shifted from image 902 by a half-pixel. Image 906 of FIG. 9C is a super-resolution image generated based on the low-resolution images 902 and 904 in accordance with the method 500 of FIG. 5. Image 902 and 904 are scaled up by a factor of two in order to compare with image 906. An improvement of sharpness on fine details of super-resolution image 906 is clearly visible. Image 908 and 910 in FIGS. 9D and 9E respectively are aliased low resolution images created in the same way as image 902 and 904 with image 910 diagonally shifted from image 908 by a half-pixel. Image 912 of FIG. 9F is a super-resolution image reconstructed based on the low-resolution image 908 and 910 in accordance with the method 500 of FIG. 5. Image 908 and 910 are also scaled up by a factor of 2 in order to compare with image 912. The super-resolution result, image 912, clearly recovers the delicate details from aliasing.

Figure 10A:
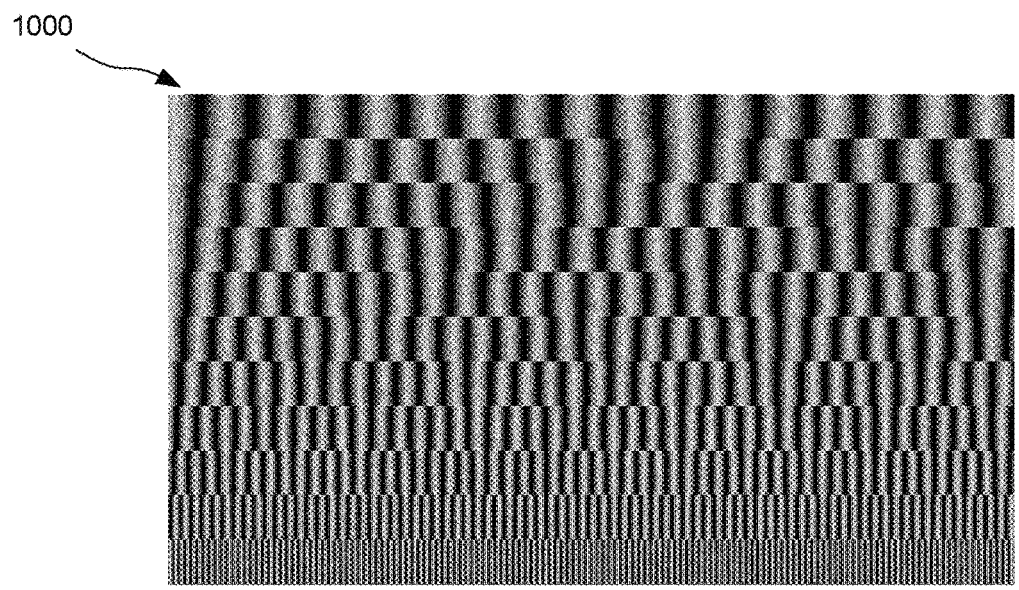
FIG. 10A is an image of a black and white line pattern for use by an optical system to evaluate example embodiments of the present disclosure.
Figure 10B:
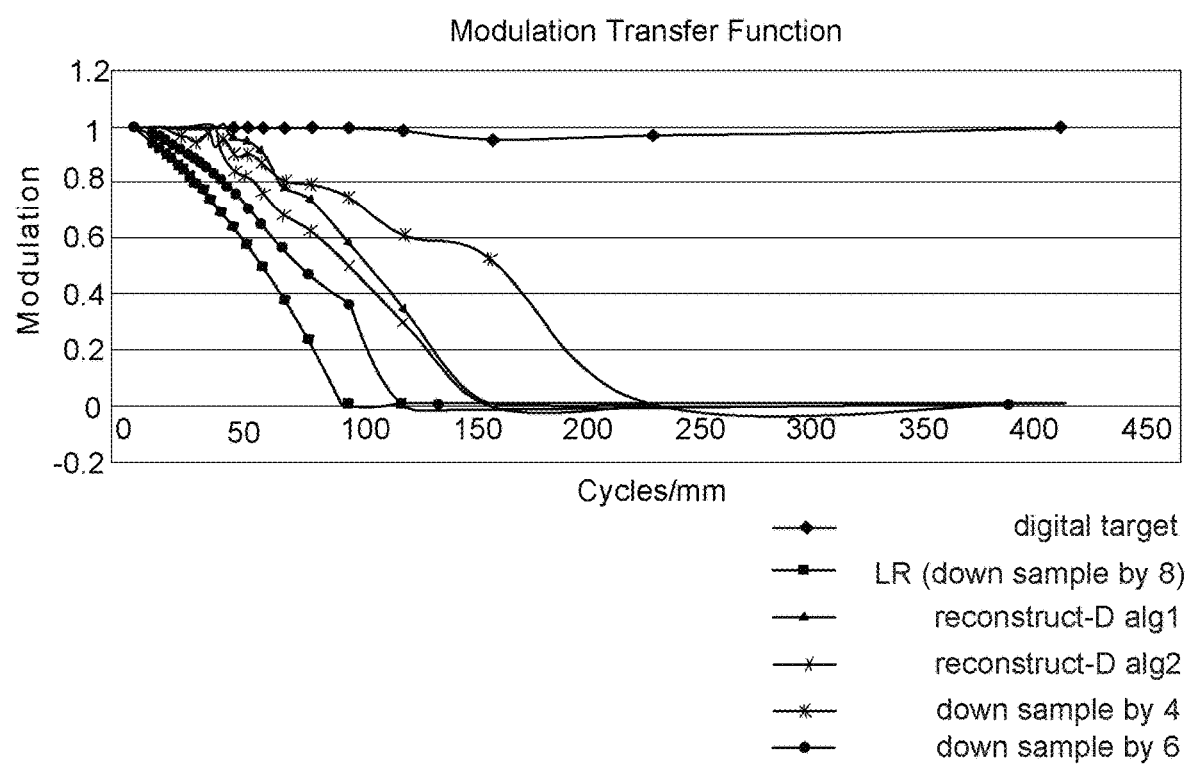
FIG. 10B is graph of a modulation transfer function for various images used to evaluate example embodiments of the present disclosure.
Figure 10C:
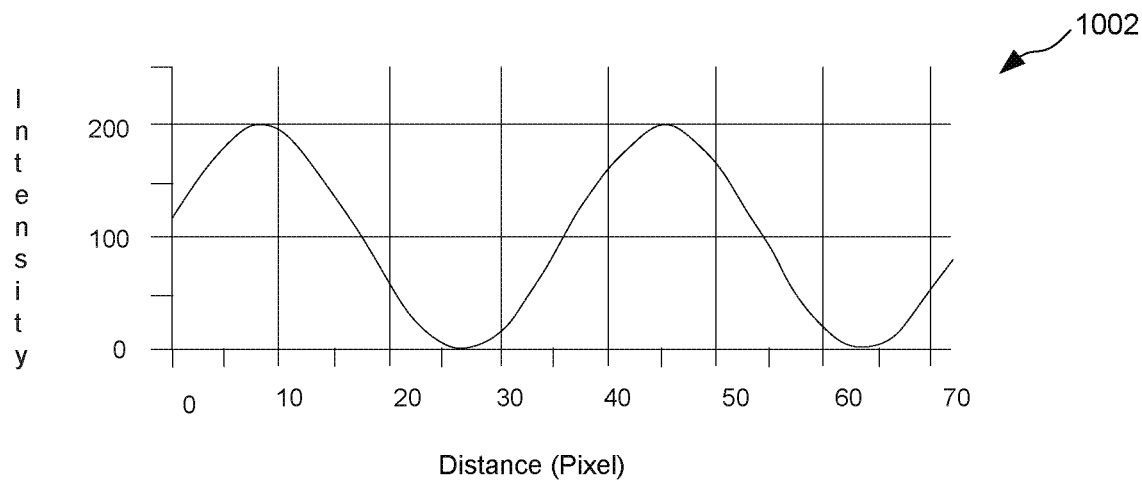
FIGS. 10C and 10D is a line profile showing sinusoidal responses of intensity over distance at two line pair spatial frequencies of the line pattern of FIG. 10A.
Figure 10D:
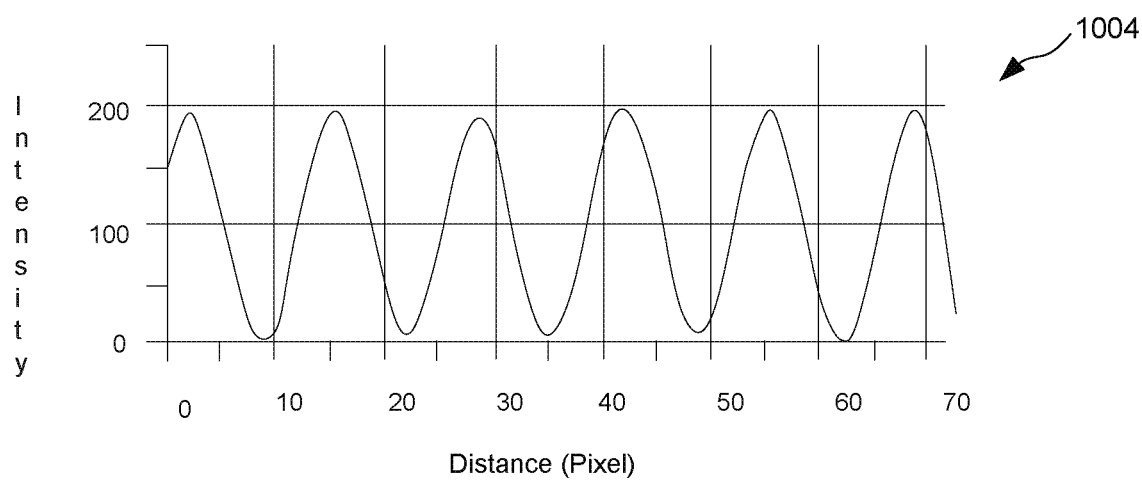

Referring now FIGS. 10A and 10B, a mathematical assessment of the spatial resolution enhancement provided by an example embodiment of the present disclosure. FIG. 10A is a simulated image with a black and white sinusoidal pattern 1000 of various spatial frequencies increasing from top to bottom. The black and white line pattern 1000 may be used by an optical system to evaluate example embodiments of the present disclosure. FIG. 10B is graph of a modulation transfer function for various images used to evaluate example embodiments of the present disclosure. FIGS. 10C and 10D are line profiles showing sinusoidal responses of intensity over distance at two line pair spatial frequencies of the line pattern of FIG. 10A identified by references respectively. It can be seen that the line profile 1004 has a greater spatial frequency than that of line profile 1002. As the ability of an image acquisition device to preserve contrast degrades at higher spatial frequencies, i.e. as the image acquisition device becomes unable to distinguish the black and line pairs, the intensity value or the amplitude of the sinusoidal wave begins to attenuate as shown in line profiles 1002 and 1004.

As is known in the art, a modulation transfer function (MTF) is a measure of the spatial resolution performance of an image acquisition device. MTF provides a measurement of the ability of an image acquisition device to transfer contrast at a particular resolution from the object to the image. That is, MTF measures a spatial frequency response of an image acquisition device or the ability of an image acquisition device to maintain contrast as the amount of detail increase in a given distance. MTF can be measured by discrete frequency generation. The modulation for a given spatial frequency may be calculated using the following equation:

$$\text{Modulation} = \frac{(I_{max} - I_{min})}{(I_{max} + I_{min})}$$

For the purposes of quantifying the spatial resolution enhancement provided by the method 500 of the present disclosure, improvement in the MTF may be indicative of the spatial resolution enhancement between the generated super-resolution image and the low-resolution images. FIG. 10B is a graph of modulation versus spatial frequency in line pairs per millimeter. The MTF graph of FIG. 10B compares of the MTF of low-resolution images down-sampled by a factor of 8 with that of images down-sampled by factors of 4 and 6 as well as the MTF of two super-resolution images generated in accordance with an example embodiment of the present disclosure. As the spatial frequency increases, the MTF curve falls until it reaches zero. As can be seen in FIG. 10B, MTF of the generated super-resolution images is between that of images downsampled by a factor of 4 and a factor of 6. Assuming that the low-resolution image is from an image acquisition device that has a pixel size of 5 μm, the images down-sampled by a factor of 4 and 6 can be considered as being from image acquisition devices having a pixel size of 2.5 μm and 3.75 μm respectively. Hence, the resolution of the regenerated super-resolution image is equivalent to the resolution of an image acquisition device having a pixel size of between 3.75 μm and 2.5 μm. Considering noise impact, the resolution improvement for the generated super-resolution images over the low-resolution images to be approximately 33% to 40%.

Figure 11:
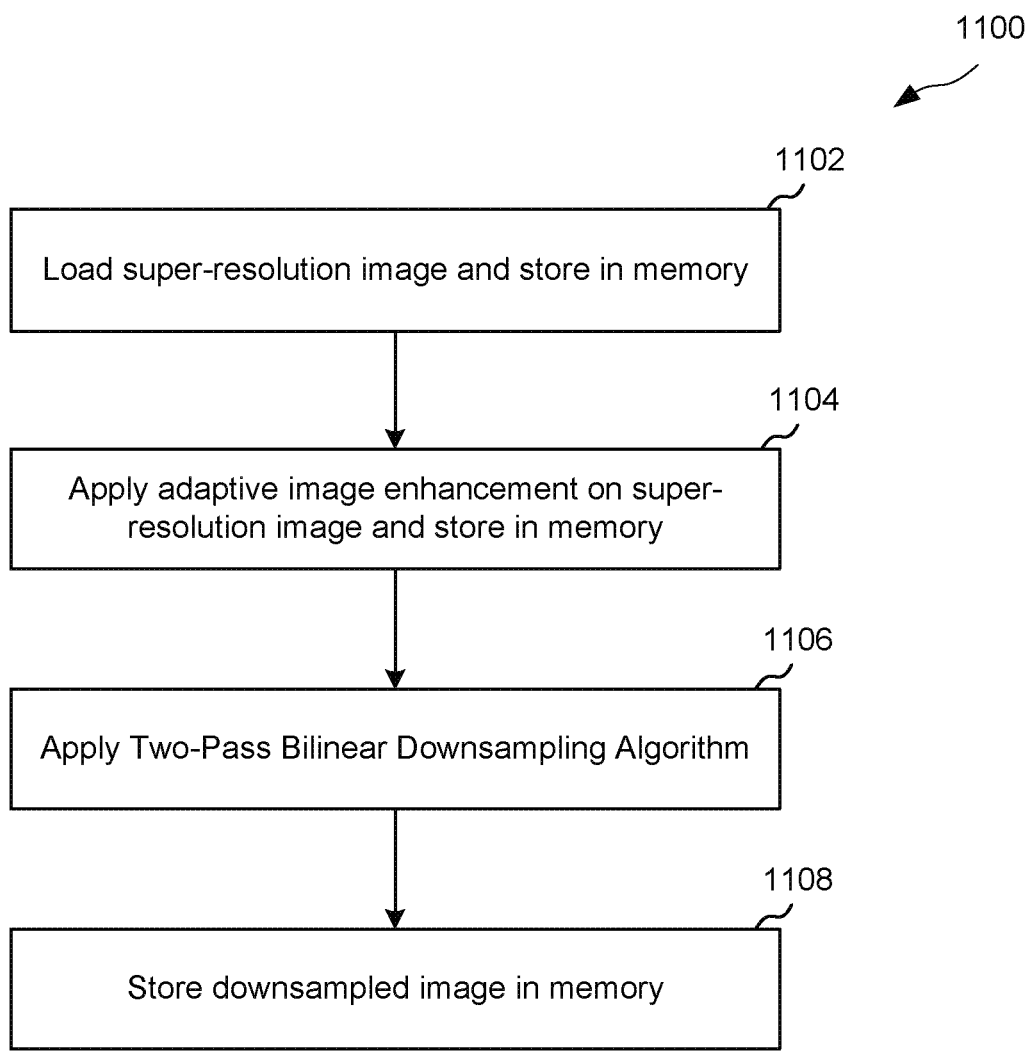
FIG. 11 is a flowchart of an example method of down-sampling a super-resolution image to generate a high MTF low-resolution image in accordance with one example embodiment of the present disclosure.

FIG. 11 shows a flowchart of method 1100 for downsampling a super-resolution image to generate a high MTF low-resolution image in accordance with an example embodiment of the present disclosure.

At operation 1100, a super-resolution image generated in accordance with the method 500 of FIG. 5 is loaded and stored in memory, for example, as SR. The super-resolution image has a dimension 2 W×2H, wherein W and H are the width and height of the low-resolution images respectively At operation 1104, the super-resolution image, SR, is adaptively enhanced, for example using the algorithms described herein, and stored in memory, for example, as SREnhance.

At operation 1106, a two-pass bilinear downsampling algorithm is applied to the adaptively enhanced super-resolution image, SREnhance. In some example embodiments, the adaptively enhanced super-resolution image is downsampled by a factor of 2:1. In accordance with one example, a first pass downsampling is performed on the enhanced super-resolution image for each pixel DN (x,y), by, starting at pixel DN(1,1), averaging every four pixels in a 2×2 kernel or region of interest (ROI), to produce a new corresponding pixel value in accordance with the following equation:

$$DN\_SD1(y,x) = 0.25 * (\Sigma_{j=2y-1}^{2y}(\Sigma_{i=2x-1}^{2x} DN(j,i)))$$

wherein $1 <= j <= 2H$, $1 <= i <= 2W$, $1 <= y <= H$, and $1 <= x <= W$.

When all the pixels in the enhanced super-resolution image have been downsampled, the resulting first intermediate low-resolution image is stored in memory, for example, as scaleDown1.

Next, a second pass downsampling is performed on the enhanced super-resolution image, but instead of starting at pixel DN(1,1), the second pass begins at pixel DN (2,2), reflecting a diagonal full pixel shift. The second pass downsampling is performed $$DN\_SD2(y,x) = 0.25 * (\Sigma_{j=2y}^{2y+1}(\Sigma_{i=2x}^{2x+1} DNU(j,i)))$$

wherein, $2 <= j <= 2H+1$, $2 <= i <= 2W+1$, $1 <= y <= H$, and $1 <= x <= W$.

When the second pass downsampling has been completed, the resulting second intermediate low-resolution image is stored in memory, for example, as scaleDown2.

Lastly, a high sharpness, low-resolution image (also known as a high accuracy, low-resolution image or a high MTF low-resolution image) is generated by combining the downsampled first and second intermediate low-resolution images, scaleDown1 and scaleDown2, by averaging as follows:

$$highMTF=0.5*(scaleDown1+scaleDown2)$$

At operation 1108, the downsampled image is stored in memory, for example, as highMTF.

Figure 12A:
FIGS. 12A-D are images illustrating results of an example embodiment of the present disclosure.
Figure 12B:
Figure 12C:
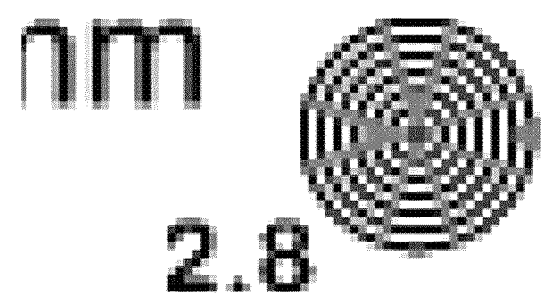
Figure 12D:

FIGS. 12A-D illustrate results of an example embodiment of the present disclosure. FIG. 12A is a portion of a super-resolution image generated using an example embodiment of the present disclosure. FIGS. 12B and 12C are the same portion of the first and second low-resolution images used to generate the super-resolution image of FIG. 12A using an example embodiment of the present disclosure. FIG. 12D is the same portion of a high MTF image generated from the super-resolution image of FIG. 12A using an example embodiment of the present disclosure. The low-resolution images in FIGS. 12B and 12C and the high MTF image in FIG. 12D are scaled up by a factor of two in order to compare with the super-resolution image in FIG. 12A.

Figure 13A:
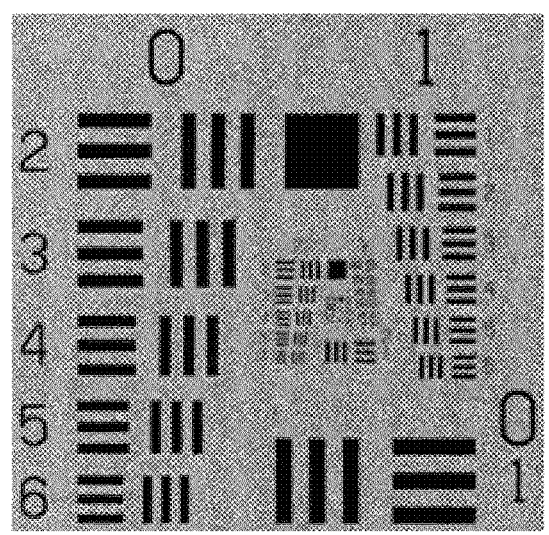
FIGS. 13A-E are images from a CMOS TDI camera illustrating results of an example embodiment of the present disclosure.
Figure 13B:
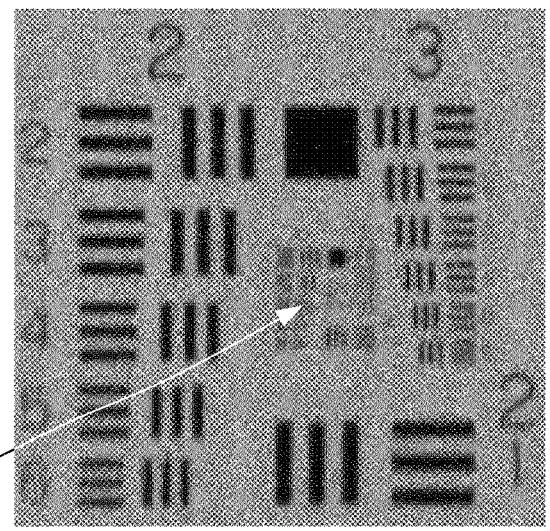
Figure 13C:
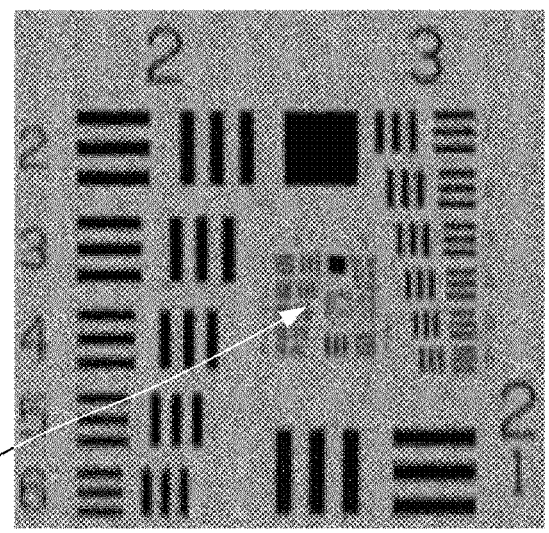
Figure 13D:
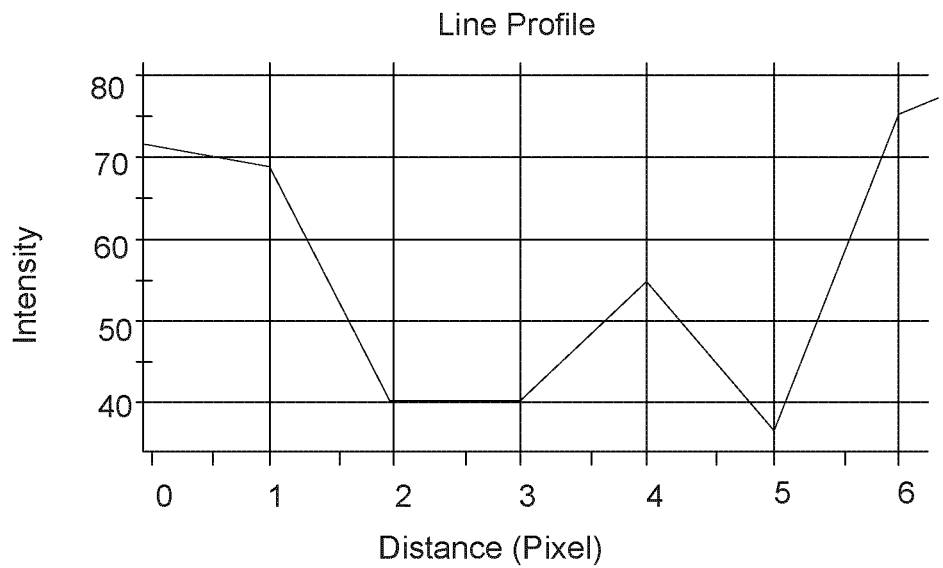
Figure 13E:
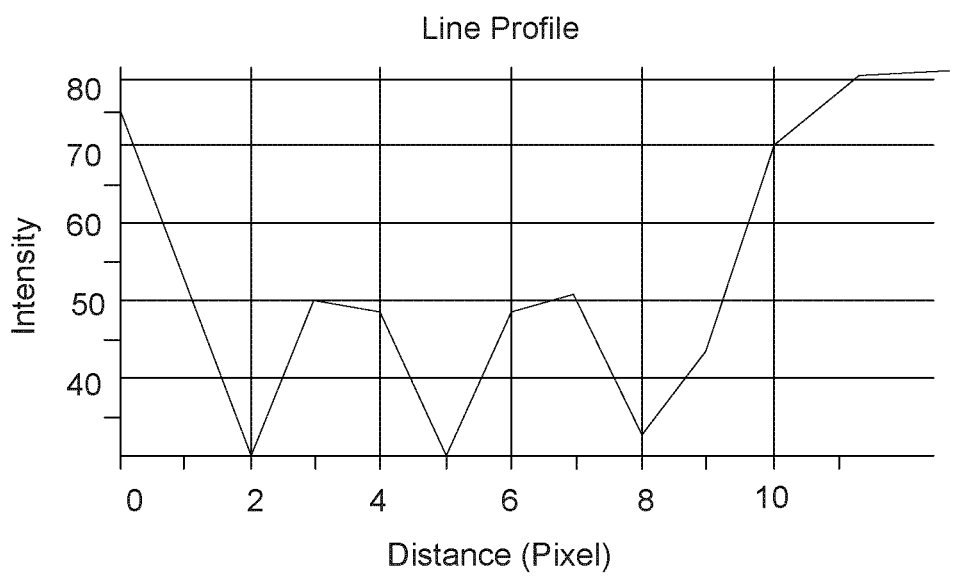

FIGS. 13A-E are images from a CMOS TDI camera illustrating results of an example embodiment of the present disclosure. The camera was set to image a USAF 1951 target. Two low-resolution images with a half-pixel shift diagonally were captured by the camera. FIG. 13A shows one of the two low-resolution image. FIG. 13B is the zoom-in of the low-resolution image FIG. 13A. FIG. 13C is the zoom-in of a super-resolution image generated based on two low-resolution images and one of the low-resolution image is as shown in FIG. 13A. For comparison, FIG. 13B is zoomed two time more than FIG. 13C. FIGS. 13D and 13E illustrate the line-profiles of the low-resolution image FIG. 13B and the super-resolution image FIG. 13C at very high frequency. The line profiles of FIGS. 13D and 13E are based on areas of the low-resolution image FIG. 13B and the super-resolution image indicated by arrows 1302 and 1304, respectively. The line profiles show that high frequency information is recovered in the super-resolution image.

Although the described embodiments are directed primarily to line scan cameras, the teachings of the present disclosure may be applied to other suitable digital imaging devices such as area scan digital cameras.

General

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The invention claimed is:

1. An image resolution enhancement system, comprising:
a processing circuit and a memory unit, wherein the memory unit is configured to store one or more instructions that, when executed by the processing circuit, causes the processing circuit to:
receive a first low-resolution image and a second low-resolution image of the same scene, wherein the first low-resolution image and the second low-resolution image have a first spatial resolution and are captured simultaneously by a pair of pixel arrays of a common image sensor, wherein the pair of pixel arrays of the image sensor are located as to be diagonally shifted from each other by a sub-pixel increment;
adaptively enhance the first low-resolution and the second low-resolution image to generate an enhanced first low-resolution image and an enhanced second low-resolution image, respectively;
extract edge information from the first low-resolution image and the second low-resolution image, respectively;
map pixels of each of the enhanced first and second low-resolution images to a super-resolution grid having a spatial resolution greater than the first spatial resolution to generate a first intermediate super-resolution image and a second intermediate super-resolution image, respectively;
combine the first intermediate super-resolution image and the second intermediate super-resolution image to generate a composite super-resolution image;
map edge information of the first and second low-resolution images to a super-resolution grid having a spatial resolution greater than the first spatial resolution to generate an enhanced super-resolution edge information; and
enhance a contrast of the composite super-resolution image with the enhanced super-resolution edge information to generate a contrast restored super-resolution image.

2. The image resolution enhancement system of claim 1, wherein the instructions that, when executed by the processing circuit, cause the processing circuit to adaptively enhance the first low-resolution and the second low-resolution image, further cause the processing circuit to:
extract first edge information from the first low-resolution image and second edge information from the second low-resolution image;
for each pixel in the first low-resolution image or the second low-resolution image:
determine, using the first edge information or second edge information, whether the pixel in the first or second low-resolution image is an edge pixel;
for each pixel that is an edge pixel,
determine a maximum value and minimum value of the pixels within a pre-determined area centered at the pixel, and
enhance a value of to the pixel in the first or second low-resolution image in response to a determination that the enhanced pixel has an initial value greater than the maximum value or less than the minimum value.

3. The image resolution enhancement system of claim 1, wherein the instructions that, when executed by the processing circuit, cause the processing circuit to adaptively enhance the first low-resolution and the second low-resolution image, further cause the processing circuit to:
extract first edge information from the first low-resolution image and second edge information from the second low-resolution image;
apply a smoothing algorithm to the first low-resolution image and the second low-resolution image;
generate an unsharp mask for each of the first low-resolution image and the second low-resolution image based on the first and second low-resolution images and the smoothed first low-resolution image and second low-resolution image, wherein the unsharp mask has a spatial resolution the same as the first spatial resolution of the first low-resolution image and the second low-resolution image;
initialize an enhanced image by adding the unsharp mask to the first or second low-resolution image
for each pixel in the first low-resolution image and the second low-resolution image:
determine, using the first edge information or second edge information, whether the pixel in the first or second low-resolution image is an edge pixel;
for each pixel that is an edge pixel,
determine a maximum value and minimum value of the pixels within a pre-determined area centered at the pixel,
determine whether the pixel has a value between the maximum value and minimum value and whether the value of the corresponding pixel in the enhanced low-resolution image is bigger than the maximum value or smaller than the minimum value,
enhance a value of a pixel in the unsharp mask corresponding to the pixel in the first or second low-resolution image by an enhancement factor in response to a determination that the pixel has a value between the maximum value and minimum value and the corresponding pixel in the enhanced low-resolution image has a value beyond the maximum value and minimum value, and
replace the value of the pixel in the enhanced low-resolution image by the sum of the enhanced value of the element in the unsharp mask and the value of the pixel in the low-resolution image.

4. The image resolution enhancement system of claim 3, wherein the instructions that, when executed by the processing circuit, cause the processing circuit to generate the unsharp mask for each of the first low-resolution image and the second low-resolution image, further cause the processing circuit to:
initialize the unsharp mask as a difference between the first or second low-resolution image and the smoothed first or second low-resolution image respectively;
for each pixel in the unsharp mask:
determine, using the first edge information or second edge information, whether the pixel in the unsharp mask is an edge pixel;
for each pixel that is an edge pixel, enhance a value of the pixel in the unsharp mask by an enhancement factor in response to an absolute value of the pixel in the unsharp mask being greater than or equal to an enhancement threshold;
for each pixel that is not an edge pixel, set a value of the pixel in the unsharp mask to zero in response to an absolute value of the pixel in the unsharp mask being less greater than or equal to a cutoff threshold;
for each pixel that is not an edge pixel, enhance a value of the pixel in the unsharp mask by an enhancement factor in response to an absolute value of the pixel in the unsharp mask being greater than or equal to the enhancement threshold.

5. The image resolution enhancement system of claim 1, wherein the instructions, when executed by the processing circuit, further cause the processing circuit to:
    extract first edge information from the first low-resolution image and second edge information from the second low-resolution image;
    map pixels of the first edge information and the second edge information to a super-resolution grid having a spatial resolution greater than the first spatial resolution to generate first super-resolution edge information and second super-resolution edge information, respectively;
    adaptively enhance and combine the first super-resolution edge information and the second super-resolution edge information to generate an enhanced super-resolution edge information grid; and
    enhance the composite super-resolution image with the enhanced super-resolution edge information grid to generate a contrast restored super-resolution image.

6. The image resolution enhancement system of claim 5, wherein the instructions that, when executed by the processing circuit, cause the processing circuit to enhance the composite super-resolution image with the enhanced super-resolution edge information, further cause the processing circuit to:
    for each pair of spatial corresponding pixels in the first super-resolution edge information and the second super-resolution edge information:
        set a spatial corresponding value of an enhanced super-resolution edge information grid to a maximum of the values of the pair of spatial corresponding pixels in response to a determination that both pixels in the pair have a positive value;
        set a spatial corresponding value of the enhanced super-resolution edge information grid to a minimum of the values of the pair of spatial corresponding pixels in response to a determination that both pixels in the pair have a negative value; and
        set a spatial corresponding value of the enhanced super-resolution edge information grid to an average of the values of the pair of spatial corresponding pixels in response to a determination that one of the pixels in the pair has a positive value and one of the pixels in the pair has a negative value; and
    combine the composite super-resolution image with the enhanced super-resolution edge information grid.

7. The image resolution enhancement system of claim 1, wherein the super-resolution grid has a spatial resolution twice that of the first low-resolution image and the second low-resolution image.

8. The image resolution enhancement system of claim 7, wherein the pixels of each of the enhanced first and second low-resolution images are mapped to the super-resolution grid non-uniformly.

9. The image resolution enhancement system of claim 1, wherein the instructions that, when executed by the processing circuit, cause the processing circuit to combine the first intermediate super-resolution image and the second intermediate super-resolution image to generate a composite super-resolution image causes the processing circuit to perform a bilinear stacking combination.

10. The image resolution enhancement system of claim 1, wherein the instructions, when executed by the processing circuit, further cause the processing circuit to:
    identify pixels in the composite super-resolution image for contrast enhancement;
    determine an amount of contrast enhancement for each pixel identified for contrast enhancement; and
    apply the determined amount of contrast enhancement to each pixel identified for contrast enhancement to generate a contrast restored super-resolution image.

11. The image resolution enhancement system of claim 10, wherein the instructions, when executed by the processing circuit, further cause the processing circuit to:
    adaptively enhance the contrast restored super-resolution image;
    starting at a first pixel, perform a first pass bilinear downsampling on the enhanced super-resolution image to generate a first intermediate low-resolution image;
    starting at a second pixel diagonally shifted from the first pixel by a pixel increment, perform a second bilinear downsampling on the enhanced super-resolution image to generate a second intermediate low-resolution image; and
    combine the first and second intermediate low-resolution images to generate a high sharpness, low-resolution image.

12. The image resolution enhancement system of claim 11, wherein the instructions, when executed by the processing circuit to combine the first and second intermediate low-resolution images, comprise instructions that, when executed by the processing circuit, cause the processing circuit to average the intensity values of spatially corresponding pixels in the first and second intermediate low-resolution images.

13. The image resolution enhancement system of claim 11, wherein the instructions that, when executed by the processing circuit, cause the processing circuit to adaptively enhance the contrast restored super-resolution image, further cause the processing circuit to:
    extract edge information from the contrast restored super-resolution image;
    for each pixel in the contrast restored super-resolution image:
        determine, using the edge information, whether the pixel is an edge pixel;
        for each pixel that is an edge pixel,
            determine a maximum value and minimum value of the pixels within a pre-determined area centered at the pixel, and
            enhance a value of the pixel in the first or second low-resolution image in response to a determination that the enhanced pixel has an initial value greater than the maximum value or less than the minimum value.

14. The image resolution enhancement system of claim 11, wherein the instructions that, when executed by the processing circuit, cause the processing circuit to perform first pass and the second pass bilinear downsamplings, comprise instructions that, when executed by the processing circuit cause the processing circuit to perform an averaging of a plurality of pixels in the high-resolution image.

15. The image resolution enhancement system of claim 1, wherein the instructions, when executed by the processing circuit, further cause the processing circuit to:
    acquire the first low-resolution image and the second low-resolution image from an image sensor.

* * * * *